(12) United States Patent
Doi et al.

(10) Patent No.: US 7,315,676 B2
(45) Date of Patent: Jan. 1, 2008

(54) OPTICAL MODULATOR, OPTICAL WAVEGUIDE DEVICE AND ACOUSTO-OPTIC TUNABLE FILTER APPARATUS

(75) Inventors: Masaharu Doi, Kawasaki (JP); Shuuichi Miyawaki, Kawasaki (JP); Tetsuo Ishizaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/505,330

(22) Filed: Aug. 17, 2006

(65) Prior Publication Data

US 2007/0140612 A1    Jun. 21, 2007

Related U.S. Application Data

(62) Division of application No. 10/349,086, filed on Jan. 23, 2003, now Pat. No. 7,113,677.

(30) Foreign Application Priority Data

May 15, 2002 (JP) .............................. 2002-140373

(51) Int. Cl.
G02B 6/26 (2006.01)
G02F 1/35 (2006.01)

(52) U.S. Cl. .............................. 385/50; 385/43; 385/39

(58) Field of Classification Search .................. 385/11, 385/45, 50
See application file for complete search history.

(56) References Cited

U.S. PATENT DOCUMENTS 4,087,159 A    5/1978    Ulrich

| 4,983,006 A | 1/1991 | Nishimoto | 385/16 |
| 5,082,341 A | 1/1992 | Walker | 385/14 |
| 5,586,209 A * | 12/1996 | Matsuura et al. | 385/45 |
| 5,799,119 A | 8/1998 | Rolland et al. | 385/28 |
| 5,862,288 A | 1/1999 | Tayag et al. | 385/129 |

(Continued)

FOREIGN PATENT DOCUMENTS

EP    0651267    5/1995

(Continued)

OTHER PUBLICATIONS

Q. Lai, et al. "Arbitrary Ratio Power Splitters Using Angled Silica on Silicon Multimode Interference Couplers," Electronic Letters, vol. 32, No. 17, Aug. 15, 1996, p. 1576-1577.

(Continued)

*Primary Examiner*—Frank G. Font
*Assistant Examiner*—Eric Wong
(74) *Attorney, Agent, or Firm*—Staas & Halsey LLP

(57) ABSTRACT

The invention provides an optical modulator wherein appearance of radiation mode light can be suppressed to improve performances as a device. The optical modulator includes a multiplexing waveguide which in turn includes two input waveguides to which propagation lights from a linear waveguide are inputted, a waveguide coupling element, and two output waveguides. The width of the waveguide coupling element on the input side is greater than the total width of the two input waveguides, and the width of the waveguide coupling element on the output side is greater than the total width of the two output waveguides. The device of the present invention is applied typically to an optical communication system.

26 Claims, 19 Drawing Sheets

U.S. PATENT DOCUMENTS

| | | | |
|---|---|---|---|
| 6,668,103 B2* | 12/2003 | Hosoi | 385/2 |
| 6,842,569 B2 | 1/2005 | Thaniyavarn | 385/41 |
| 2001/0053262 A1 | 12/2001 | Kinoshita et al. | 385/24 |
| 2002/0015561 A1 | 2/2002 | Kawashima et al. | 385/42 |

FOREIGN PATENT DOCUMENTS

| | | |
|---|---|---|
| GB | 1525492 | 9/1978 |
| GB | 2239715 | 7/1991 |
| JP | 61-72207 | 4/1986 |
| JP | 9-178964 | 7/1997 |
| JP | 9311233 | 12/1997 |
| JP | 10-160951 | 6/1998 |
| JP | 10-260380 | 9/1998 |
| JP | 11-133364 | 5/1999 |
| JP | 2000-121857 | 4/2000 |
| JP | 2000-162454 | 6/2000 |
| JP | 2001-209018 | 8/2001 |
| JP | 2002286952 | 10/2002 |

OTHER PUBLICATIONS

Japanese Office Action mailed on Oct. 24, 2006 in corresponding Japanese Application No. 2002-140373.

Bachmann, et al., "General Self-Imaging Properties in N×N Multimode Interference Couplers Including Phase Relations", Applied Optics, Jun. 20, 1994, vol. 33, No. 18, pp. 3905-3911.

Soldano, et al., "Planar Monomode Optical Couplers Based on Multimode Interference Effects", Journal of Lightwave Technology, Dec. 1992, vol. 10, No. 12, pp. 1843-1849.

Soldano, et al., "Large Optical Bandwidth Of InGaAsP/InP Multi-Mode Interference 3-dB Couplers", 6th European Conference on Integrated Optics, Apr. 18-22, 1993.

European Search Report dated Dec. 21, 2005 for corresponding application No. GB 0520648.7.

* cited by examiner

OPTICAL MODULATOR, OPTICAL WAVEGUIDE DEVICE AND ACOUSTO-OPTIC TUNABLE FILTER APPARATUS

This application is a divisional of application Ser. No. 10/349,086, filed Jan. 23, 2003 now U.S. Pat. No. 7,113,667.

BACKGROUND OF THE INVENTION

1) Field of the Invention

This invention relates to an optical modulator and an optical waveguide device suitable for use with an optical communication system.

2) Description of the Related Art

FIG. 16 is a schematic view showing a conventional optical multiplexer/demultiplexer having two inputs and two outputs. The optical multiplexer/demultiplexer 700 shown in FIG. 16 includes two input waveguides 702 and 703, a waveguide coupling element 706 and two output waveguides 704 and 705 formed on a substrate 701. The optical multiplexer/demultiplexer 700 can multiplex or demultiplex, when input light propagating in the input waveguides 702 and/or 703 is to be outputted to the output waveguides 704 or/and 705 through the waveguide coupling element 706, the input light.

In the optical multiplexer/demultiplexer 700, for example, input light $P_0$ inputted to the input waveguide 702 is demultiplexed into and outputted as output lights $P_1$ and $P_2$ from the output waveguides 704 and 705 through the waveguide coupling element 706.

Here, in FIG. 16, the input and output waveguides 702 to 705 have an equal width $w_0$, and they are connected with a width d left therebetween to the waveguide coupling element 706. Further, the two input waveguides 702 and 703 and the two output waveguides 704 and 705 are formed individually with an angle θ defined therebetween such that the distance therebetween decreases toward the waveguide coupling element 706.

The connection angle θ of the input and output waveguides 702 to 705 to the interference waveguide 706 is sufficiently small. Therefore, since the widths A and B of the connection points between the input and output waveguides 702 to 705 and the waveguide coupling element 706 can be approximated as an equal value to the input and output waveguide width $w_0$, the width $w_w$ of the waveguide coupling element 706 can be represented as $2w_0+d$. It is to be noted that, in FIG. 16, reference character Lc denotes the length of the waveguide coupling element 706 in its longitudinal direction (propagation direction of light).

For example, if the length Lc is adjusted to form the waveguide coupling element 706 as shown in FIG. 17, then the characteristic as the optical multiplexer/demultiplexer 700, that is, the multiplexing/demultiplexing characteristic for input light, can be varied.

In particular, as shown in FIG. 17, where the length Lc is equal to $L_1$, the ratio $[P_1/\{P_1+P_2\}]$ of the output light $P_1$ to the overall output light $\{P_1+P_2\}$ is equal to 1. Therefore, the output light from the optical multiplexer/demultiplexer 700 is outputted as the output light $P_1$ only from the output waveguide 704.

On the other hand, where the length Lc is equal to L2, since the ratio $P_1/\{P_1+P_2\}$ is equal to 0.5, the branching ratio of the input light $P_0$ at the output waveguides 704 and 705 is 1:1, and the output light from the optical multiplexer/demultiplexer 700 is outputted as the output lights $P_1$ and $P_2$ from the output waveguides 704 and 705, respectively. In other words, the optical multiplexer/demultiplexer 700 can be used as a 3 dB coupler.

Further, where the length Lc is equal to L3, since the ratio $P_1/\{P_1+P_2\}$ is equal to 0, the output light from the optical multiplexer/demultiplexer 700 is outputted as the output light $P_2$ only from the output waveguide 705.

The optical multiplexer/demultiplexer 700 having such a configuration as described above can be used as 3 dB couplers 700A and 700B, for example, in such a Mach-Zehnder type modulator 710 as shown in FIG. 18. Here, the Mach-Zehnder type optical modulator 710 shown in FIG. 18 includes a Mach-Zehnder type optical waveguide 714 formed from 3 dB couplers 700A and 700B and two linear waveguides 712 and 713 on a substrate 711, and further includes a signal electrode 715 and a ground electrode 716 formed on the substrate 711.

In the Mach-Zehnder type optical modulator 710 having the configuration described above, input light inputted through an input waveguide 702A from between two input waveguides 702A and 703A which form the 3 dB coupler 700A is branched at a ratio of 1:1, and the branched lights propagate in the linear optical waveguides 712 and 713. It is to be noted that, by a variation of an electric field by a signal voltage applied to the signal electrode 715, light modulated in accordance with the signal voltage just mentioned can be outputted from the output waveguides 704B and 705B.

Further, the lights propagating in the linear waveguides 712 and 713 are inputted to the input waveguides 702B and 703B which form the 3 dB coupler 700B, respectively, and then multiplexed by the waveguide coupling element 706B, whereafter the multiplexed light is outputted from both of the output waveguides 704B and 705B. Particularly, the output light from the output waveguide 704B is used as monitor light, and the output light from the output waveguide 705B is used as signal light.

However, in such a conventional optical waveguide device as described above, a great difference exists between a propagation mode in the input and output waveguides and a propagation mode in the waveguide coupling element, and therefore, there is a subject that an radiation mode appear.

Further, also where an optical waveguide device from which such radiation mode light as just described is generated is applied to a device such as an optical modulator, a wavelength filter or the like, there is the possibility that, by generation of the radiation mode described above, the performance improvement of the device itself may be hindered.

Particularly, where the optical waveguide device 700 having such a configuration as described above is applied as the 3 dB couplers 700A and 700B to such a Mach-Zehnder type optical modulator 700 as described above with reference to FIG. 18, radiation mode light is generated in the 3 dB coupler 700B described above. Therefore, a deviation δ appears between a voltage value $V_1$ when the signal light (refer to a full line waveform in FIG. 19) is in an on state and a voltage value $V_2$ at an off point of the monitor light (refer to a broken line waveform in FIG. 19) as shown in FIG. 19 although they are desirably to be coincident with each other. The ratio $[(V_2-V_1)/V_\pi]$ of the deviation to the half-wavelength voltage $V_\pi$ is approximately 10%, and this makes a hindrance to use of the output light of the conventional optical waveguide device 700 as monitor light for adjustment of the operating point.

SUMMARY OF THE INVENTION

It is an object of the present invention to provide an optical modulator and an optical waveguide device wherein production of radiation mode light can be suppressed to improve performances as a device.

In order to attain the object described above, according to an aspect of the present invention, there is provided an optical waveguide device, comprising two input waveguides, a waveguide coupling element for coupling the two input waveguides with a first distance, and two output waveguides branched from the waveguide coupling element with a second distance, the first distance in the waveguide coupling element being set to one half or less of width at a portion at which each of the input waveguides is connected to the waveguide coupling element, width of the waveguide coupling element on the input waveguides side being set to 2.5 times to 3.5 times the width at the portion at which each of the input waveguides is connected to the waveguide coupling element.

According to another aspect of the present invention, there is provided an optical waveguide device, comprising two input waveguides, a waveguide coupling element for coupling the two input waveguides with a first distance, and two output waveguides branched from the waveguide coupling element with a second distance, the second distance in the waveguide coupling element being set to one half or less of width at a portion at which each of the output waveguides is connected to the waveguide coupling element, width of the waveguide coupling element on the output waveguides side being set to 2.5 times to 3.5 times the width at the portion at which each of the output waveguides is connected to the waveguide coupling element.

According to a further aspect of the present invention, there is provided an optical waveguide device, comprising a substrate having an electro-optical effect, a polarization wave separating waveguide formed on the substrate for separating propagation light into polarization waves of two polarization modes of TM and TE, two linear waveguides formed on the substrate for individually propagating the propagation lights separated by the polarization wave separating waveguide, and a polarization wave synthesis waveguide formed on the substrate for synthesizing the propagation lights from the two linear waveguides, the polarization wave separating waveguide including two input waveguides, a waveguide coupling element, and two output waveguides, width of the waveguide coupling element on the input side being set greater than the width of the two input waveguides, width of the waveguide coupling element on the output side being set greater than the width of the two output waveguides.

According a still further aspect of the present invention, there is provided an optical modulator, comprising a substrate, and an optical device provided on the substrate and including a branching waveguide for branching propagation light into two lights, two linear waveguides for propagating the propagation lights branched by the branching waveguide, and a synthesis waveguide for synthesizing the propagation lights from the two linear waveguides such that a phase difference is provided to the propagation lights in the two linear waveguides, the synthesis waveguide including two input waveguides for receiving the propagation lights from the two linear waveguides as inputs thereto, a waveguide coupling element, and two output waveguides, width of the waveguide coupling element on the input side being set greater than the width of the two input waveguides, width of the waveguide coupling element on the output side being set greater than the width of the two output waveguides.

According to a yet further aspect of the present invention, there is provided an optical waveguide device, comprising two input waveguides, a waveguide coupling element for coupling the two input waveguides with a distance $d_1$, and two output waveguides branched from the waveguide coupling element with a distance $d_2$, the distance $d_1$, in the waveguide coupling element being set to one half or less of width $w_{01}$ of a portion at which each of the input waveguides is connected to the waveguide coupling element, width $w_{w1}$ of the waveguide coupling element on the input waveguides side being set to 2.5 times to 3.5 times the width $w_{01}$.

The optical waveguide device may be configured such that the distance $d_2$ in the waveguide coupling element is set to one half or less of width $w_{02}$ of a portion at which each of the output waveguides is connected to the waveguide coupling element, and width $w_{w2}$ of the waveguide coupling element on the output waveguides side is set to 2.5 times to 3.5 times the width $w_{02}$.

According to a yet further aspect of the present invention, there is provided an optical waveguide device, comprising two input waveguides, a waveguide coupling element for coupling the two input waveguides with a distance $d_1$, and two output waveguides branched from the waveguide coupling element with a distance $d_2$, the distance $d_2$ in the waveguide coupling element being set to one half or less of width $w_{02}$ of a portion at which each of the output waveguides is connected to the waveguide coupling element, width $w_{w2}$ of the waveguide coupling element on the output waveguides side being set to 2.5 times to 3.5 times the width $w_{02}$.

According to a yet further aspect of the present invention, there is provided an optical waveguide device, comprising two input waveguides, a waveguide coupling element for coupling the two input waveguides with a distance $d_1$, and two output waveguides branched from the waveguide coupling element with a distance $d_2$, width $w_{w1}$ of the waveguide coupling element on the input waveguides side being greater than the sum $2w_{01}+d_1$ of the sum $2w_{01}$ of widths of portions at which the two input waveguides are connected to the waveguide coupling element and the distance $d_1$ so that radiation mode light can be suppressed better than where the width $w_{w1}$ is equal to the sum $2w_{01}+d_1$.

The optical waveguide device may be configured such that width $w_{w2}$ of the waveguide coupling element on the output waveguides side is greater than the sum $2w_{02}+d_2$ of the sum $2w_{02}$ of widths of portions at which the two output waveguides are connected to the waveguide coupling element and the distance $d_2$ so that radiation mode light can be suppressed better than where the width $w_{w2}$ is equal to the sum $2w_{02}+d_2$.

According to a yet further aspect of the present invention, there is provided an optical waveguide device, comprising two input waveguides, a waveguide coupling element for coupling the two input waveguides with a distance $d_1$, and two output waveguides branched from the waveguide coupling element with a distance $d_2$, width $w_{w2}$ of the waveguide coupling element on the output waveguides side being greater than the sum $2w_{02}+d_2$ of the sum $2w_{02}$ of widths of portions at which the two output waveguides are connected to the waveguide coupling element and the distance $d_2$ so that radiation mode light can be suppressed better than where the width $w_{w2}$ is equal to the sum $2w_{02}+d_2$.

According to a yet further aspect of the present invention, there is provided an optical waveguide device, comprising a substrate having an electro-optical effect, and a Mach-Zehnder type optical waveguide formed on the substrate and including a branching waveguide for branching propagation light into two propagation lights, two linear waveguides for propagating the two propagation lights branched by the branching waveguide, and a multiplexing waveguide for multiplexing the propagation lights from the two linear waveguides, the multiplexing waveguide including two input waveguides for inputting the propagation lights from the linear waveguides, a waveguide coupling element for coupling the two input waveguides with a distance $d_1$, and two output waveguides branched from the waveguide coupling element with another distance $d_2$, the distance $d_1$ in the waveguide coupling element being set to one half or less of width $w_{O1}$ at a portion at which each of the input waveguides is connected to the waveguide coupling element, width $w_{w1}$ of the waveguide coupling element on the input waveguides side being set to 2.5 times to 3.5 times the width $w_{O1}$, the length of the waveguide coupling element being set so that light propagating in one of the two input waveguides is branched to the two output waveguides with a power radio of 1.1.

According to a yet further aspect of the present invention, there is provided an optical waveguide device, comprising a substrate having an electro-optical effect, and a Mach-Zehnder type optical waveguide formed on the substrate and including a branching waveguide for branching propagation light into two propagation lights, two linear waveguides for propagating the two propagation lights branched by the branching waveguide, and a multiplexing waveguide for multiplexing the propagation lights from the two linear waveguides, the multiplexing waveguide including two input waveguides for inputting the propagation lights from the linear waveguides, a waveguide coupling element for coupling the two input waveguides with distance $d_1$, and two output waveguides branched from the waveguide coupling element with another distance $d_2$, the distance $d_2$ in the waveguide coupling element being set to one half or less of width $w_{O2}$ at a portion at which each of the output waveguides is connected to the waveguide coupling element, width $w_{w2}$ of the waveguide coupling element on the output waveguides side being set to 2.5 times to 3.5 times the width $w_{O2}$, the length of the waveguide coupling element being set so that light propagating in one of the two input waveguides is branched to the two output waveguides with a power radio of 1.1.

According to a yet further aspect of the present invention, there is provided an optical waveguide device, comprising a substrate having an electro-optical effect, a polarization wave separating waveguide formed on the substrate for separating propagation light into polarization waves of polarization modes of TM and TE, two linear waveguides formed on the substrate for individually propagating the propagation lights separated by the polarization wave separating waveguide, and a polarization wave synthesis waveguide formed on the substrate for synthesizing the propagation lights from the two linear waveguides, the polarization wave separating waveguide including two input waveguides, a waveguide coupling element for coupling the two input waveguides with a distance $d_1$, and two output waveguides branched from the waveguide coupling element with another distance $d_2$, the distance $d_1$ in the waveguide coupling element being set to one half or less of width $w_{O1}$ at a portion at which each of the input waveguides is connected to the waveguide coupling element, width $w_{w1}$ of the waveguide coupling element on the input waveguides side being set to 2.5 times to 3.5 times the width $w_{O1}$, the length of the waveguide coupling element being set so that, where polarization waves of the two polarization modes of TM and TE are inputted from one of the two input waveguides, the polarization waves may individually be outputted to different ones of the output waveguides from each other.

According to a yet further aspect of the present invention, there is provided an optical waveguide device, comprising a substrate having an electro-optical effect, a polarization wave separating waveguide formed on the substrate for separating propagation light into polarization waves of polarization modes of TM and TE, two linear waveguides formed on the substrate for individually propagating the propagation lights separated by the polarization wave separating waveguide, and a polarization wave synthesis waveguide formed on the substrate for synthesizing the propagation lights from the two linear waveguides, the polarization wave separating waveguide including two input waveguides, a waveguide coupling element for coupling the two input waveguides with a distance $d_1$, and two output waveguides branched from the waveguide coupling element with another distance $d_2$, the distance $d_2$ in the waveguide coupling element being set to one half or less of width $w_{O2}$ at a portion at which each of the output waveguides is connected to the waveguide coupling element, width $w_{w2}$ of the waveguide coupling element on the output waveguides side being set to 2.5 times to 3.5 times the width $w_{O2}$, the length of the waveguide coupling element being set so that, where polarization waves of the two polarization modes of TM and TE are inputted from one of the two input waveguides, the polarization waves may individually be outputted to different ones of the output waveguides from each other.

According to a yet further aspect of the present invention, there is-provided an optical waveguide device, comprising a substrate having an electro-optical effect, a polarization wave separating waveguide formed on the substrate for separating propagation light into polarization waves of polarization modes of TM and TE, two linear waveguides formed on the substrate for individually propagating the propagation lights separated by the polarization wave separating waveguide, and a polarization wave synthesis waveguide formed on the substrate for synthesizing the propagation lights from the two linear waveguides, the polarization wave synthesis waveguide including two input waveguides for receiving the propagation lights from the two linear waveguides as inputs thereto, a waveguide coupling element for coupling the two input waveguides with a distance $d_1$, and two output waveguides branched from the waveguide coupling element with another distance $d_2$, the distance $d_1$ in the waveguide coupling element being set to one half or less of width $w_{O1}$ at a portion at which each of the input waveguides is connected to the waveguide coupling element, width $w_{w1}$ of the waveguide coupling element on the input waveguides side being set to 2.5 times to 3.5 times the width $w_{O1}$, the length of the waveguide coupling element being set so that, where a polarization wave of the polarization mode of TM is inputted from one of the two input waveguides and another polarization wave of the polarization mode of TE is inputted from the other of the two input waveguides, the polarization waves may be synthesized by the waveguide coupling element and the synthesized polarization light may be outputted to one of the output waveguides.

According to a yet further aspect of the present invention, there is provided an optical waveguide device, comprising a substrate having an electro-optical effect, a polarization wave separating waveguide formed on the substrate for separating propagation light into polarization waves of polarization modes of TM and TE, two linear waveguides formed on the substrate for individually propagating the propagation lights separated by the polarization wave separating waveguide, and a polarization wave synthesis waveguide formed on the substrate for synthesizing the propagation lights from the two linear waveguides, the polarization wave synthesis waveguide including two input waveguides for receiving the propagation lights from the two linear waveguides as inputs thereto, a waveguide coupling element for coupling the two input waveguides with a distance $d_1$ and two output waveguides branched from the waveguide coupling element with another distance $d_2$, the distance $d_2$ in the waveguide coupling element being set to one half or less of width $w_{o2}$ at a portion at which each of the output waveguides is connected to the waveguide coupling element, width $w_{w2}$ of the waveguide coupling element on the output waveguides side being set to 2.5 times to 3.5 times the width $w_{o2}$, the length of the waveguide coupling element being set so that, where a polarization wave of the polarization mode of TM is inputted from one of the two input waveguides and another polarization wave of the polarization mode of TE is inputted from the other of the two input waveguides, the polarization waves may be synthesized by the waveguide coupling element and the synthesized polarization wave may be outputted from one of the output waveguides.

According to a yet further aspect of the present invention, there is provided an optical modulator, comprising a substrate having an electro-optical effect, a Mach-Zehnder type optical waveguide formed on the substrate, a signal electrode section provided on the optical waveguide for being supplied with a signal voltage, a bias electrode section provided on the optical waveguide for being supplied with a bias voltage, a coupler provided on the outgoing side of the Mach-Zehnder type optical waveguide for fetching monitor light, a monitor photodiode for detecting a light signal of the monitor light fetched by the coupler, and a bias voltage control section for controlling the bias voltage to be supplied to the bias electrode section based on the light signal detected by the monitor photodiode, the coupler including two input waveguides through one of which light from the Mach-Zehnder type optical waveguide is inputted, a waveguide coupling element for coupling the two input waveguides with a distance $d_1$, and a signal light propagating output waveguide and a monitoring output waveguide branched from the waveguide coupling element with a distance $d_2$, the distance $d_1$ in the waveguide coupling element being set to one half or less of width $w_{o1}$ at a portion at which each of the input waveguides is connected to the waveguide coupling element, width $w_{w1}$ of the waveguide coupling element on the input waveguides side being set to 2.5 times to 3.5 times the width $w_{o1}$, the length of the waveguide coupling element being set so that light which propagates in one of the two input waveguides may be branched to the two output waveguides with a power radio of 1.1.

According to a yet further aspect of the present invention, there is provided an optical modulator, comprising a substrate having an electro-optical effect, a Mach-Zehnder type optical waveguide formed on the substrate, a signal electrode section provided on the optical waveguide for being supplied with a signal voltage, a bias electrode section provided on the optical waveguide for being supplied with a bias voltage, a coupler provided on the outgoing side of the Mach-Zehnder type optical waveguide for fetching monitor light, a monitor photodiode for detecting a light signal of the monitor light fetched by the coupler, and a bias voltage control section for controlling the bias voltage to be supplied to the bias electrode section based on the light signal detected by the monitor photodiode, the coupler including two input waveguides through one of which light from the Mach-Zehnder type optical waveguide is inputted, a waveguide coupling element for coupling the two input waveguides with a distance $d_1$, and a signal light propagating output waveguide and a monitoring output waveguide branched from the waveguide coupling element with a distance $d_2$, the distance $d_2$ in the waveguide coupling element being set to one half or less of width $w_{o2}$ at a portion at which each of the output waveguides are connected to the waveguide coupling element, width $w_{w2}$ of the waveguide coupling element on the input waveguides side being set to 2.5 times to 3.5 times the width $w_{o2}$, the length of the waveguide coupling element being set so that light which propagates one of the two input waveguides may be branched to the two output waveguides with a power radio of 1.1.

According to a yet further aspect of the present invention, there is provided an optical modulator, comprising a substrate having an electro-optical effect, first and second Mach-Zehnder type optical waveguides formed in series on the substrate, a first signal electrode section provided on the first Mach-Zehnder type optical waveguide for being supplied with a clock signal, a second signal electrode section provided on the second Mach-Zehnder type optical waveguide for being supplied with a data signal, a first bias electrode section provided on the first Mach-Zehnder type optical waveguide for being supplied with a bias voltage, a second bias electrode section provided on the second Mach-Zehnder type optical waveguide for being supplied with another bias voltage, a first coupler provided on the outgoing side of the first Mach-Zehnder type optical waveguide for fetching monitor light, a second coupler provided on the outgoing side of the second Mach-Zehnder type optical waveguide for fetching monitor light, a first monitor photodiode for detecting a light signal of the monitor light fetched by the first coupler, a second monitor photodiode for detecting a light signal of the monitor light fetched by the second coupler, a first bias voltage control section for controlling the bias voltage to be supplied to the first bias electrode section based on the light signal detected by the first monitor photodiode, and a second bias voltage control section for controlling the bias voltage to be supplied to the second bias electrode section based on the light signal detected by the second monitor photodiode, the first coupler including two input waveguides through one of which light from the first Mach-Zehnder type optical waveguide is inputted, a waveguide coupling element for coupling the two input waveguides with a distance $d_{11}$, and two output waveguides branched from the waveguide coupling element with a distance $d_{21}$, the distance $d_{11}$ in the waveguide coupling element of the first coupler being set to one half or less of width $w_{o11}$ at a portion at which each of the input waveguides is connected to the waveguide coupling element, width $w_{w11}$ of the waveguide coupling element on the input waveguides side being set to 2.5 times to 3.5 times the width $w_{o11}$.

According to a yet further aspect of the present invention, there is provided an optical modulator, comprising a substrate having an electro-optical effect, first and second Mach-Zehnder type optical waveguides formed in series on the substrate, a first signal electrode section provided on the first Mach-Zehnder type optical waveguide for being supplied with a clock signal, a second signal electrode section provided on the second Mach-Zehnder type optical waveguide for being supplied with a data signal, a first bias electrode section provided on the first Mach-Zehnder type optical waveguide for being supplied with a bias voltage, a second bias electrode section provided on the second Mach-Zehnder type optical waveguide for being supplied with another bias voltage, a first coupler provided on the outgoing side of the first Mach-Zehnder type optical waveguide for fetching monitor light, a second coupler provided on the outgoing side of the second Mach-Zehnder type optical waveguide for fetching monitor light, a first monitor photodiode for detecting a light signal of the monitor light fetched by the first coupler, a second monitor photodiode for detecting a light signal of the monitor light fetched by the second coupler, a first bias voltage control section for controlling the bias voltage to be supplied to the first bias electrode section based on the light signal detected by the first monitor photodiode, and a second bias voltage control section for controlling the bias voltage to be supplied to the second bias electrode section based on the light signal detected by the second monitor photodiode, the first coupler including two input waveguides through one of which light from the first Mach-Zehnder type optical waveguide is inputted, a waveguide coupling element for coupling the two input waveguides with a distance $d_{11}$, and two output waveguides branched from the waveguide coupling element with a distance $d_{21}$, the distance $d_{21}$ in the waveguide coupling element of the first coupler being set to one half or less of width $w_{021}$ at a portion at which each of the output waveguides is connected to the waveguide coupling element, width $w_{w21}$ of the waveguide coupling element on the output waveguides side being set to 2.5 times to 3.5 times the width $w_{021}$.

According to a yet further aspect of the present invention, there is provided an optical modulator, comprising a substrate having an electro-optical effect, first and second Mach-Zehnder type optical waveguides formed in series on the substrate, a first signal electrode section provided on the first Mach-Zehnder type optical waveguide for being supplied with a clock signal, a second signal electrode section provided on the second Mach-Zehnder type optical waveguide for being supplied with a data signal, a first bias electrode section provided on the first Mach-Zehnder type optical waveguide for being supplied with a bias voltage, a second bias electrode section provided on the second Mach-Zehnder type optical waveguide for being supplied with another bias voltage, a first coupler provided on the outgoing side of the first Mach-Zehnder type optical waveguide for fetching monitor light, a second coupler provided on the outgoing side of the second Mach-Zehnder type optical waveguide for fetching monitor light, a first monitor photodiode for detecting a light signal of the monitor light fetched by the first coupler, a second monitor photodiode for detecting a light signal of the monitor light fetched by the second coupler, a first bias voltage control section for controlling the bias voltage to be supplied to the first bias electrode section based on the light signal detected by the first monitor photodiode, and a second bias voltage control section for controlling the bias voltage to be supplied to the second bias electrode section based on the light signal detected by the second monitor photodiode, the second coupler including two input waveguides through one of which light from the second Mach-Zehnder type optical waveguide is inputted, a waveguide coupling element for coupling the two input waveguides with a distance $d_{12}$, and two output waveguides branched from the waveguide coupling element with a distance $d_{22}$, the distance $d_{12}$ in the waveguide coupling element of the second coupler being set to one half or less of width $w_{012}$ at a portion at which the input waveguides are connected to the waveguide coupling element, width $w_{w12}$ of the waveguide coupling element on the input waveguides side being set to 2.5 times to 3.5 times the width $w_{012}$.

According to a yet further aspect of the present invention, there is provided an optical modulator, comprising a substrate having an electro-optical effect, first and second Mach-Zehnder type optical waveguides formed in series on the substrate, a first signal electrode section provided on the first Mach-Zehnder type optical waveguide for being supplied with a clock signal, a second signal electrode section provided on the second Mach-Zehnder type optical waveguide for being supplied with a data signal, a first bias electrode section provided on the first Mach-Zehnder type optical waveguide for being supplied with a bias voltage, a second bias electrode section provided on the second Mach-Zehnder type optical waveguide for being supplied with another bias voltage, a first coupler provided on the outgoing side of the first Mach-Zehnder type optical waveguide for fetching monitor light, a second coupler provided on the outgoing side of the second Mach-Zehnder type optical waveguide for fetching monitor light, a first monitor photodiode for detecting a light signal of the monitor light fetched by the first coupler, a second monitor photodiode for detecting a light signal of the monitor light fetched by the second coupler, a first bias voltage control section for controlling the bias voltage to be supplied to the first bias electrode section based on the light signal detected by the first monitor photodiode, and a second bias voltage control section for controlling the bias voltage to be supplied to the second bias electrode section based on the light signal detected by the second monitor photodiode, the second coupler including two input waveguides through one of which light from the second Mach-Zehnder type optical waveguide is inputted, a waveguide coupling element for coupling the two input waveguides with a distance $d_{12}$, and two output waveguides branched from the waveguide coupling element with a distance $d_{22}$, the distance $d_{22}$ in the waveguide coupling element of the second coupler being set to one half or less of width $w_{022}$ at a portion at which each of the output waveguides is connected to the waveguide coupling element, width $w_{w22}$ of the waveguide coupling element on the output waveguides side being set to 2.5 times to 3.5 times the width $w_{022}$.

According to a yet further aspect of the present invention, there is provided an optical modulator, comprising a substrate having an electro-optical effect, first and second Mach-Zehnder type optical waveguides formed in series on the substrate, a first signal electrode section provided on the first Mach-Zehnder type optical waveguide for being supplied with a clock signal, a second signal electrode section provided on the second Mach-Zehnder type optical waveguide for being supplied with a data signal, a first bias electrode section provided on the first Mach-Zehnder type optical waveguide for being supplied with a bias voltage, a second bias electrode section provided on the second Mach-Zehnder type optical waveguide for being supplied with another bias voltage, a first coupler provided on the outgoing side of the first Mach-Zehnder type optical waveguide for fetching monitor light, a second coupler provided on the outgoing side of the second Mach-Zehnder type optical waveguide for fetching monitor light, a first monitor photodiode for detecting a light signal of the monitor light fetched by the first coupler, a second monitor photodiode for detecting a light signal of the monitor light fetched by the second coupler, a first bias voltage control section for controlling the bias voltage to be supplied to the first bias electrode section based on the light signal detected by the first monitor photodiode, and a second bias voltage control section for controlling the bias voltage to be supplied to the second bias electrode section based on the light signal detected by the second monitor photodiode, the first coupler including two first input waveguides through one of which light from the first Mach-Zehnder type optical waveguide is inputted, a first waveguide coupling element for coupling the two first input waveguides with a distance $d_{11}$, and two first output waveguides branched from the first waveguide coupling element with a distance $d_{21}$, the second coupler including two second input waveguides through one of which light from the second Mach-Zehnder type optical waveguide is inputted, a second waveguide coupling element for coupling the two second input waveguides with a distance $d_{12}$, and two second output waveguides branched from the second waveguide coupling element with a distance $d_{22}$, the distances $d_{11}$ and $d_{21}$ in the first waveguide coupling element of the first coupler being set to one half or less of widths $w_{o11}$ and $w_{o21}$ at portions at which each of the first input waveguides and each of the first output waveguides are connected to the first waveguide coupling element, respectively, the widths $w_{w11}$ and $w_{w21}$ of the first waveguide coupling element on the first input waveguides side and the first output waveguides side being set to 2.5 times to 3.5 times the widths $w_{o11}$ and $w_{o21}$, respectively, the distances $d_{12}$ and $d_{22}$ in the second waveguide coupling element of the second coupler being set to one half or less of widths $w_{o12}$ and $w_{o22}$ at portions at which each of the second input waveguides and each of the second output waveguides are connected to the second waveguide coupling element, respectively, the widths $w_{w12}$ and $w_{w22}$ of the second waveguide coupling element on the second input waveguides side and the second output waveguides side being set to 2.5 times to 3.5 times the widths $w_{o12}$ and $w_{o22}$, respectively.

According to a yet further aspect of the present invention, there is provided an acousto-optic tunable filter apparatus, comprising a substrate, and first and second acousto-optic tunable filters formed in series on the substrate and utilizing an acousto-optic effect, each of the first and second acousto-optic tunable filters including an optical waveguide which in turn includes a first polarization beam splitter for separating propagation light into polarization waves of polarization modes of TM and TE, two linear waveguides for individually propagating the propagation lights separated by the first polarization beam splitter, and a second polarization beam splitter for synthesizing the propagation lights from the two linear waveguides, each of the first and second acousto-optic tunable filters further including an electrode for receiving an RF signal to be used to generate a surface acoustic wave for the acousto-optic effect on the optical waveguide, the first polarization beam splitter including two polarization wave separating input waveguides, a polarization wave separating waveguide coupling element for coupling the two polarization wave separating input waveguides with a distance $d_{13}$ so that lights propagating in the two polarization wave separating input waveguides interfere with each other, and two polarization wave separating output waveguides branched from the polarization wave separating waveguide coupling element with a distance $d_{23}$, the second polarization beam splitter including two polarization wave synthesizing input waveguides, a polarization wave synthesizing waveguide coupling element for coupling the two polarization wave synthesizing input waveguides with a distance $d_{14}$ so that lights propagating in the two polarization wave synthesizing input waveguides interfere with each other, and two polarization wave synthesizing output waveguides branched from the polarization wave synthesizing waveguide coupling element with a distance $d_{24}$, the distances $d_{13}$ and $d_{23}$ being set to one half or less of widths $w_{o13}$ and $w_{o23}$ at portions at which each of the polarization wave separating input waveguides and each of the polarization wave separating output waveguides are connected to the polarization wave separating waveguide coupling element, respectively, widths $w_{w13}$ and $w_{w23}$ of the polarization wave separating waveguide coupling element on the polarization wave separating input waveguides and the polarization wave separating output waveguides sides being set to 2.5 times to 3.5 times the widths $w_{o13}$ and $w_{o23}$, respectively, the distances $d_{14}$ and $d_{24}$ being set to one half or less of widths $w_{o14}$ and $w_{o24}$ at portions at which each of the polarization wave synthesizing input waveguides and each of the polarization wave synthesizing output waveguides are connected to the polarization wave synthesizing waveguide coupling element, respectively, widths $w_{w14}$ and $w_{w24}$ of the polarization wave synthesizing waveguide coupling element on the polarization wave synthesizing input wave guides and the polarization wave synthesizing output waveguides sides being set to 2.5 times to 3.5 times the widths $w_{o14}$ and $w_{o24}$, respectively.

With the optical modulators, optical waveguide devices and acousto-optical filter apparatus according to the present invention, the following advantages can be achieved.

1. Since the multiplexing waveguide is configured such that it includes two input waveguides for receiving propagation lights from the linear waveguides, a waveguide coupling element and two output waveguides and the width on the input side of the waveguide coupling element is greater than the total width of the two input waveguides while the width on the output side of the waveguide coupling element is greater than the total width of the two output waveguides, there is an-advantage that generation of radiation mode light on the incoming side and the outgoing side of the waveguide coupling element can be suppressed to improve the performance as a device.

2. Since the width of the polarization wave separating waveguide on the input side of the waveguide coupling element is greater than the total width of the two input waveguides and the width on the output side of the waveguide coupling element is greater than the total width of the two output waveguides, there is an advantage that generation of radiation mode light on the incoming side and the outgoing side of the waveguide coupling element can be suppressed to improve the performance as a device.

3. Since the distance between the two input waveguides in the waveguide coupling element is set to one half or less of the width of the portion at which each of the input waveguides is connected to the waveguide coupling element and the width of the waveguide coupling element on the input waveguides side is set to 2.5 times to 3.5 times the width, there is an advantage that generation of radiation mode light at least on the incoming side of the wave guide coupling element can be suppressed to improve the performance as a device.

4. Since the distance between the two output waveguides in the waveguide coupling element is set to one half or less of the width of the portion at which each of the output waveguides is connected to the waveguide coupling element and the width of the waveguide coupling element on the output waveguides side is set to 2.5 times to 3.5 times the width, there is an advantage that generation of radiation mode light at least on the outgoing side of the waveguide coupling element can be suppressed to improve the performance as a device.

5. Since generation of radiation mode light can be suppressed by the polarization beam splitter, where polarization beam splitters are connected at multiple stages particularly as in an acousto-optic tunable filter apparatus, the extinction ratio of the polarization beam splitters connected in multiple stages can be improved.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

In the following, embodiments of the present invention are described with reference to the drawings.

[A] Description of the First Embodiment

Figure 1:
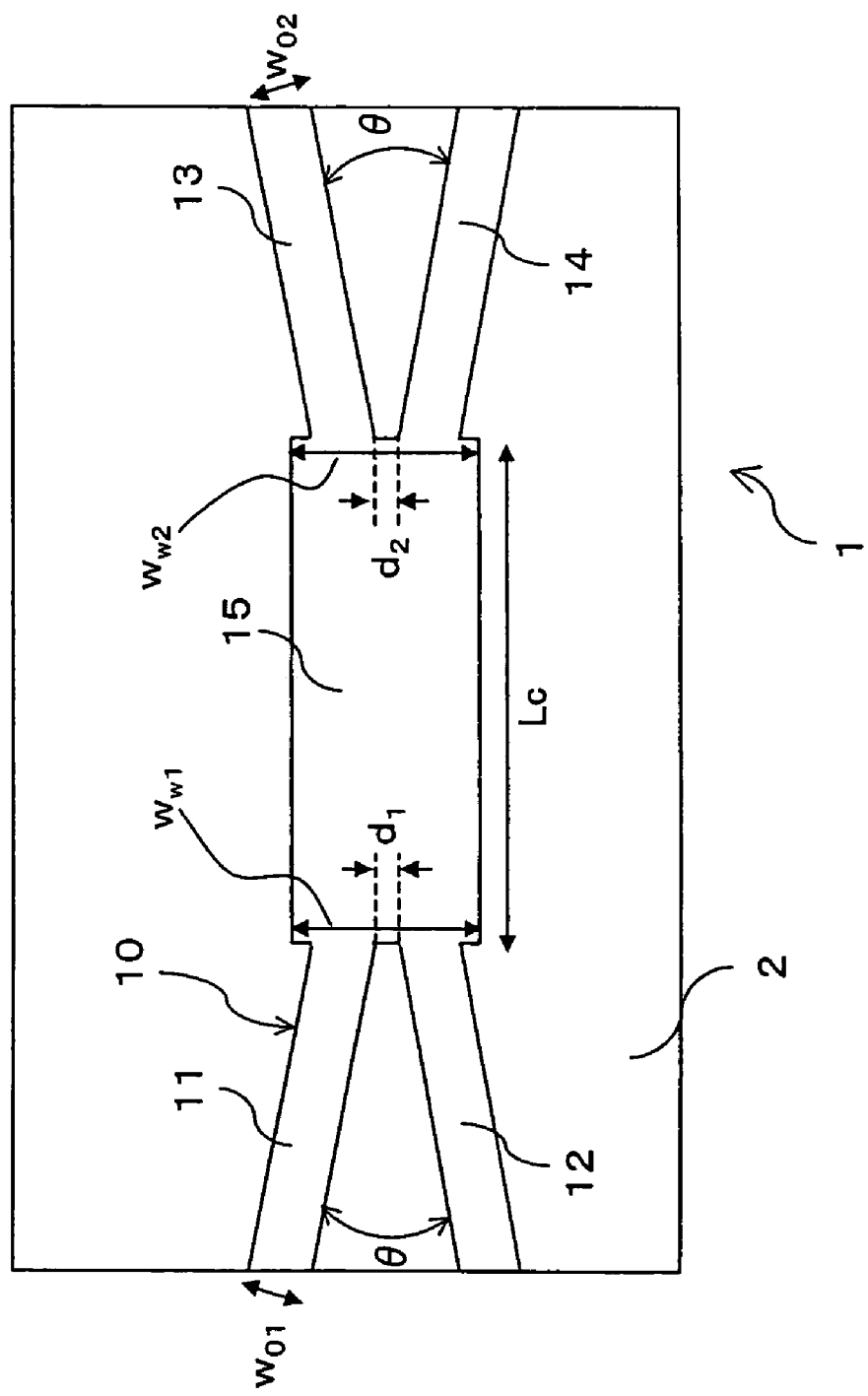
FIG. 1 is a schematic view showing an optical waveguide device according to a first embodiment of the present invention.

FIG. 1 is a schematic top plan view showing an optical waveguide device 1 according to a first embodiment of the present invention. The optical waveguide device 1 shown in FIG. 1 includes a substrate 2 having an electro-optical effect and an optical waveguide 10 formed on the substrate 2. The optical waveguide 10 includes two input waveguides 11 and 12, two output waveguides 13 and 14, and a waveguide coupling element 15.

Here, the input waveguides 11 and 12 propagate lights incoming to the optical waveguide device 1, and the waveguide coupling element 15 is connected to the two input waveguides 11 and 12 with a distance $d_1$ therebetween and causes the lights propagating in the two input waveguides 11 and 12 to interfere with each other. Further, the output waveguides 13 and 14 are branched with another distance $d_2$ from the waveguide coupling element 15 and propagate the lights caused to interfere with each other by the waveguide coupling element 15.

Further, the waveguide coupling element 15 has a characteristic width $w_w$ of the present invention (that is, the width $w_{w1}$ on the input waveguides 11 and 12 side and the width $w_{w2}$ on the output waveguides 13 and 14 side), and the length Lc thereof is designed so that light inputted from one of the input waveguides 11 and 12 is branched with a predetermined branching ratio to the output waveguides 13 and 14.

It is to be noted that the two input waveguides 11 and 12 of the optical waveguide device 1 according to the first embodiment are formed with a uniform width $w_{01}$, and are connected to the waveguide coupling element 15 with an opening angle of 0.5 degrees or more at portions at which the two input waveguides 11 and 12 and the waveguide coupling element 15 are connected (coupled) to each other. Similarly, also the output waveguides 13 and 14 are formed with a uniform width $w_{02}$ ($\approx w_{01}$) substantially equal to that of the input waveguides 11 and 12, and are connected to the waveguide coupling element 15 with an opening angle θ of 0.5 degrees or more (for example, 0.5 degrees) at portions at which the two output waveguides 13 and 14 and the waveguide coupling element 15 are connected (coupled) to each other.

Consequently, the distances between the waveguides 11 to 14 are secured to facilitate connection where the input and output waveguides 11 to 14 of the optical waveguide device 1 are connected to, for example, optical fibers or the like.

Figure 16:
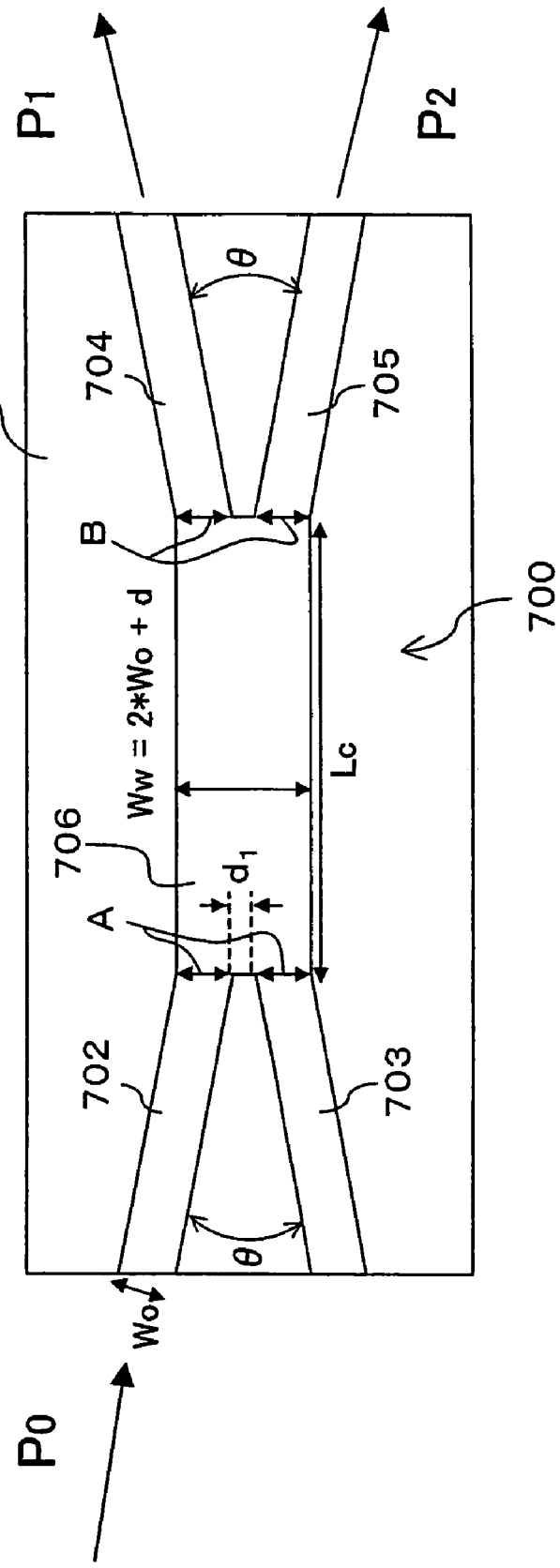
FIG. 16 is a schematic view showing a conventional optical multiplexer/demultiplexer having two inputs and two outputs.
Figure 17:
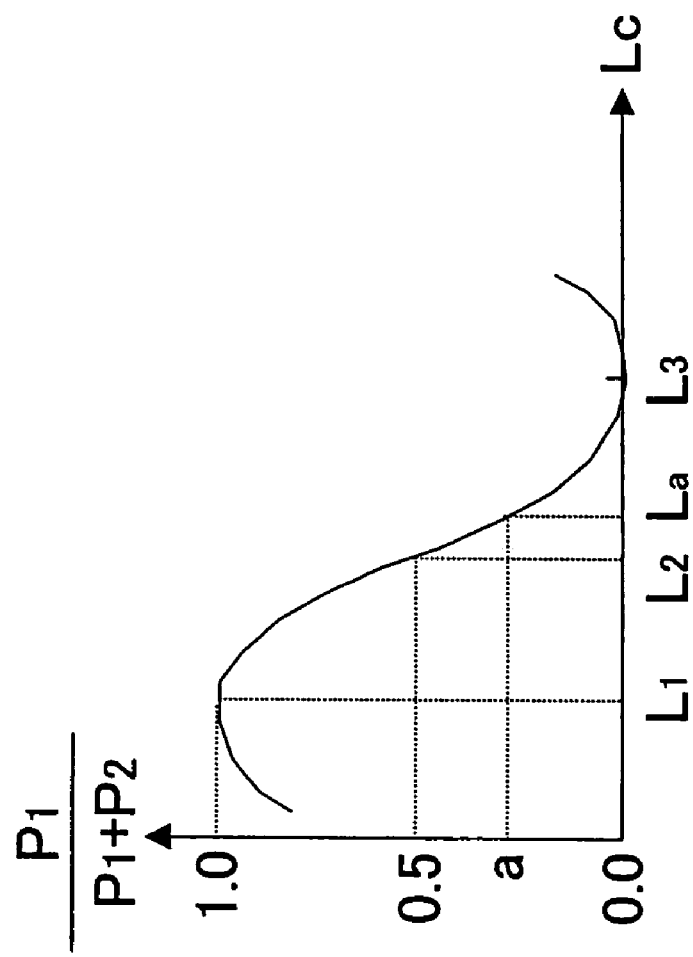
FIG. 17 is a waveform diagram illustrating a fact that, by adjusting the length of a waveguide coupling element, a characteristic of the optical multiplexer/demultiplexer shown in FIG. 16 can be varied.
Figure 18:
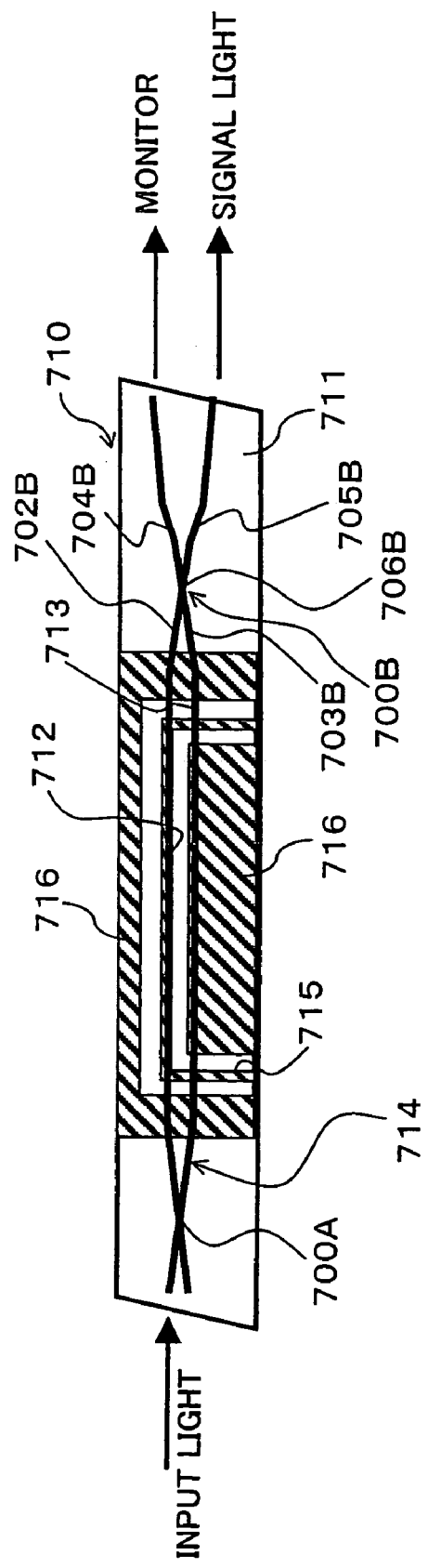
FIG. 18 is a schematic view showing an example of a case wherein the optical multiplexer/demultiplexer shown in FIG. 16 is applied to a Mach-Zehnder type modulator.
Figure 19:
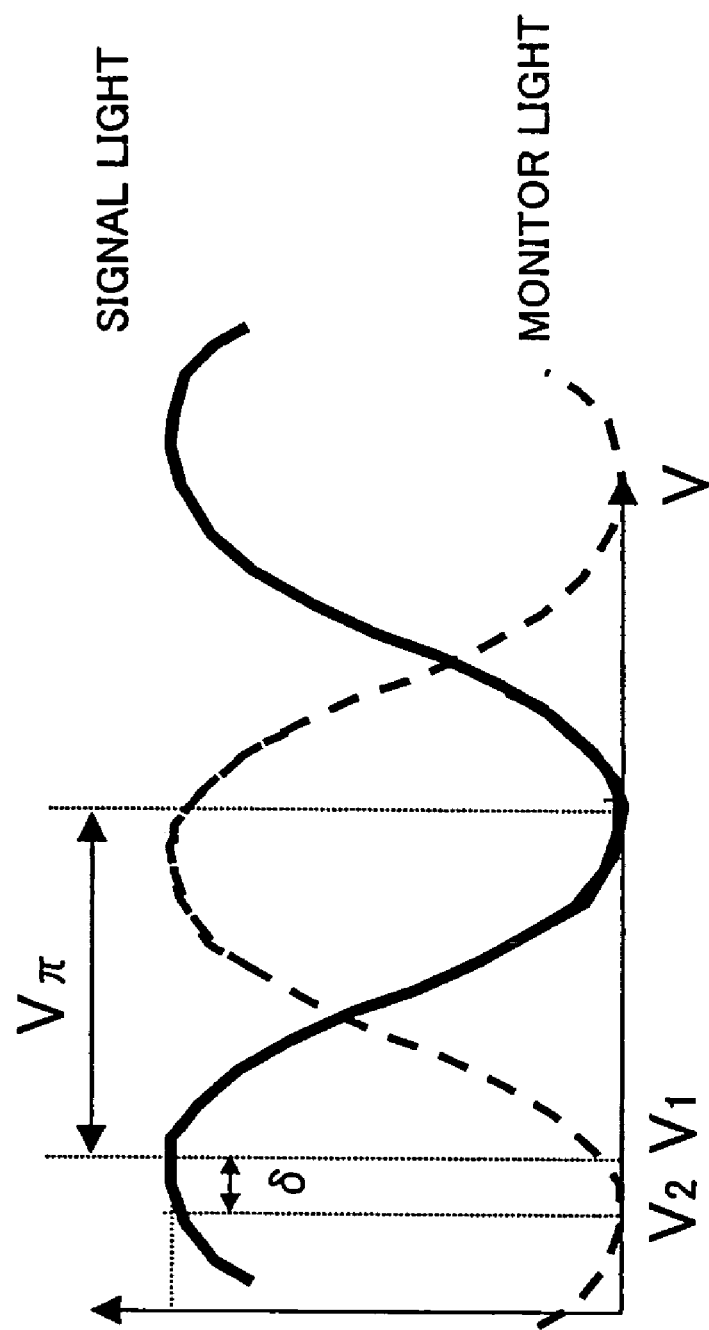
FIG. 19 is a waveform diagram illustrating a subject to be resolved by the present invention.

Incidentally, also in the optical waveguide device 1, by adjusting the length Lc of the waveguide coupling element 15 similarly as in the optical multiplexer/demultiplexer 700 described hereinabove with reference to FIG. 16, when light ($P_1+P_2$) is inputted to one of the two input waveguides 11 and 12, if lights $P_1$, and $P_2$ are branched to the output waveguides 13 and 14 as shown in FIG. 17, respectively, then the branching ratio $P_1/(P_1+P_2)$ of the input light to be inputted to the output waveguides 13 and 14 can be varied.

For example, where the length Lc of the waveguide coupling element 15 is Lc=$L_1$, light is propagated only to the output waveguide 13 [$P_1/(P_1+P_2)$=1], but where the length Lc is Lc=$L_3$, light is propagated only to the output waveguide 14 [$P_1/(P_1+P_2)$=0], and further, where the length Lc is Lc=$L_2$, light is propagated to both of the output waveguides 13 and 14 with a branching ratio of 1:1[$P_1/(P_1+P_2)$=0.5].

Figure 2:
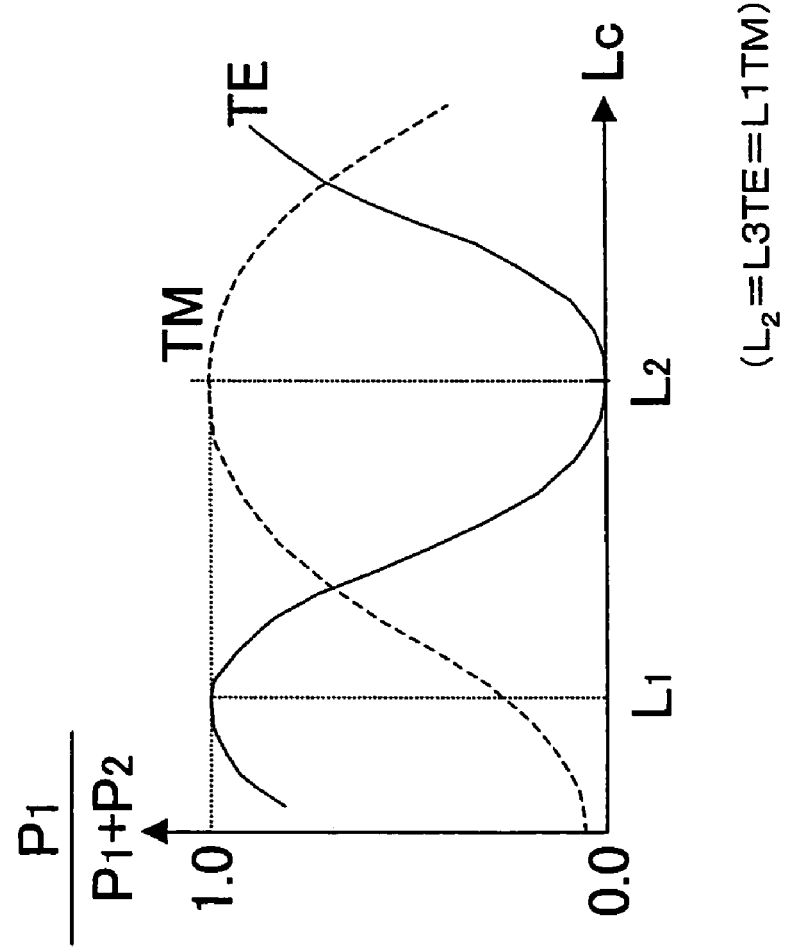
FIG. 2 is a waveform diagram illustrating a length of a waveguide coupling element with which the optical waveguide device in the first embodiment can be used as a 3 dB coupler.

In other words, if the length of the waveguide coupling element 15 is $L_2$ shown in FIG. 2, then the optical waveguide device 1 can be used as a 3 dB coupler.

Further, where the length $L_3$ of the waveguide coupling element 15 with which, when light inputted to the input waveguide 11 is TE polarized light, the light is outputted only to the output waveguide 14 is represented by L3TE and the length $L_1$ of the waveguide coupling element 15 with which, when TM polarized light is inputted to the input waveguide 11, the light is outputted only to the output waveguide 13 is represented by L1TM, if the opening angle θ of the input and output waveguides 11 to 14 and waveguide production conditions such as the waveguide widths $w_{01}$ and $w_{02}$ of the input and output waveguides 11 to 14 and so forth are adjusted, then the length Lc can be set to Lc=$L_2$ (=L3TE=L1TM), for example, as shown in FIG. 2.

Figure 3:
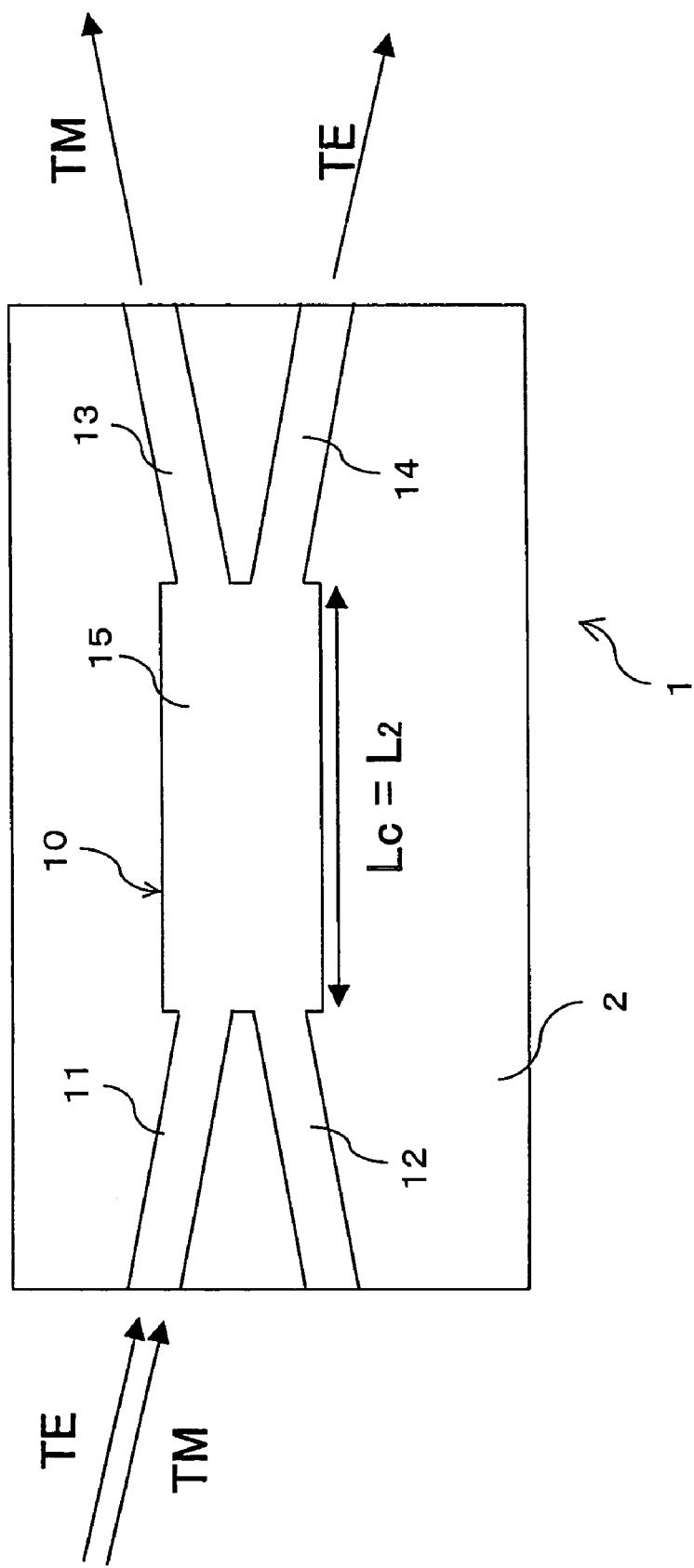
FIG. 3 is a schematic top plan view showing the optical waveguide device in the first embodiment when it functions as a polarization beam splitter.

In other words, if the length of the waveguide coupling element 15 is $L_2$ shown in FIG. 2, then, the optical waveguide device 1 can used to function, for example, as shown in FIG. 3, as a polarization beam splitter (polarization coupler) which polarizes and splits light inputted from the input waveguide 11 so that TM polarized light and TE polarized light can be outputted from the output waveguides 13 and 14, respectively.

Accordingly, the length Lc of the waveguide coupling element 15 can be set so that, where a polarized wave of one of the two polarization modes of TM and TE is inputted from one of the two input waveguides 11 and 12, the polarized wave described above may be branched with a desired branching ratio to the two output waveguides 13 and 14. Further, the length Lc of the waveguide coupling element 15 can be set so that, where polarized waves of the two polarization modes of TM and TE are inputted from one of the two input waveguides 11 and 12, the polarized waves described above may be branched with a desired branching ratio to the two output waveguides 13 and 14.

The characteristic width $w_w$ of the waveguide coupling element 15 of the optical waveguide device 1 according to the present invention is described in detail below.

While the width of the waveguide coupling element 706 in the optical multiplexer/demultiplexer 700 shown in FIG. 16 is substantially equal to the width as taken between the opposite outer sides of the two input waveguides 702 and 703 or the two output waveguides 704 and 705, in the optical waveguide device 1 according to the first embodiment, the waveguide coupling element 15 has a shape wherein it projects in the opposite widthwise directions.

In particular, in the optical waveguide device 1, the width $w_{w1}$ on the input side of the waveguide coupling element 15 is greater than the total width $2w_{01}$ of the two input waveguides 11 and 12, and the width $w_{w2}$ on the output side of the waveguide coupling element 15 is greater than the total width $2w_{02}$ of the two output waveguides 13 and 14. Consequently, appearance of radiation mode light when the lights from the input waveguides 11 and 12 interfere with each other in the waveguide coupling element 15 and appearance of radiation mode light when light propagated in the waveguide coupling element 15 is branched to the output waveguides 13 and 14 can be suppressed.

In particular, in the optical waveguide device 1 according to the first embodiment, the width $w_{w1}$ of the waveguide coupling element on the input waveguides 11 and 12 side is greater than the sum $2w_{01}+d_1$ of the sum $2w_{01}$ of the widths of the portions at which the two input waveguides 11 and 12 are connected to the waveguide coupling element 15 and the distance $d_1$ so that the radiation mode light can be suppressed better than where the width $w_{w1}$ is equal to the sum $2w_{01}+d_1$.

Similarly, the width $w_{w2}$ of the waveguide coupling element 15 on the output side waveguides 13 and 14 side is greater than the sum $2w_{02}+d_2$ of the sum $2w_{02}$ of the widths of the portions at which the two output waveguides 13 and 14 are connected to the waveguide coupling element 15 and the distance $d_2$ so that radiation mode light can be suppressed better than where the width $w_{w2}$ is equal to the sum $2w_{02}+d_2$.

It is to be noted that, while the input and output waveguides 11 to 14 described above are connected to the waveguide coupling element 15 with an angle of 0.5 degrees, the connection angle θ of the optical waveguides 11 to 14 to the interference waveguide 15 is sufficiently small, and the widths of portions at which the waveguides 11 to 14 are connected to the waveguide coupling element 15 can be approximated to the waveguide widths $w_{01}$ and $w_{02}$. Accordingly, the sum of the widths of the portions at which the two input waveguides 11 and 12 described above are connected to the waveguide coupling element 15 can be approximated to $2w_{01}$, and the sum of the widths of the portions at which the output waveguides 13 and 14 are connected to the waveguide coupling element 15 can be approximated to $2w_{02}$.

At this time, where the distance $d_1$ between the connection portions between the input waveguides 11 and 12 and the waveguide coupling element 15 is one half or less of the width $w_{01}$ of the input waveguides 11 and 12, it is desirable that the waveguide coupling element 15 has the width $w_{w1}$ widened by substantially one half of the width $w_{01}$ of the input waveguides 11 and 12 from the outside edges of the input waveguides 11 and 12 at the connection location.

Similarly, where the distance $d_2$ between the connection portions between the output waveguides 13 and 14 and the waveguide coupling element 15 is one half or less of the width $w_{02}$ of the output waveguides 13 and 14, it is desirable that the waveguide coupling element 15 has the width $w_{w2}$ widened by substantially one half of the width $w_{02}$ of the output waveguides 11 and 12 from the outside edges of the output waveguides 13 and 14 at the connected location.

In this instance, the distance $d_1$ on the waveguide coupling element 15 is one half or less of the width $w_{01}$ of the portions described above at which the input waveguides are connected to the waveguide coupling element, and the width $w_{w1}$ of the waveguide coupling element 15 on the output waveguides 11 and 12 side is 2.5 times to 3.5 times the width $w_{01}$ just described.

Similarly, the distance $d_2$ on the waveguide coupling element 15 is one half or less of the width $w_{02}$ of the portions at which the output waveguides 13 and 14 are connected to the waveguide coupling element 15, and the width $w_{w2}$ of the waveguide coupling element 15 on the output waveguides 13 and 14 side is 2.5 times to 3.5 times the width $w_{02}$ described above.

Further, in the optical waveguide device 1 according to the first embodiment, the distances $d_1$ and $d_2$ are substantially equal to each other, and the width $w_{01}$ of the input waveguides 11 and 12 and the width $w_{02}$ of the output waveguides 13 and 14 are substantially equal to each other. Furthermore, the widths $w_{w1}$ and $w_{w2}$ of the waveguide coupling element 15 on the input and output waveguides 11 to 14 sides are substantially equal to each other.

For example, the widths of the input and output waveguides 11 to 14 are $w_{01}=w_{02}$=approximately 7 μm, and the distances are $d_1=d_2=$approximately 1 μm, and end portions in widthwise directions of the waveguide coupling element 15 project by approximately 2.5 μm from the outer edge portions of the input and output waveguides 11 to 14.

By the configuration described above, in the optical waveguide device 1 according to the first embodiment of the present invention, when light propagating in the input waveguide 11 or 12 is inputted to the waveguide coupling element 15 and when light propagating in the waveguide coupling element 15 is branched to the output waveguides 13 and 14, appearance of radiation mode light (radiation light) can be suppressed as described below.

Figure 4A:
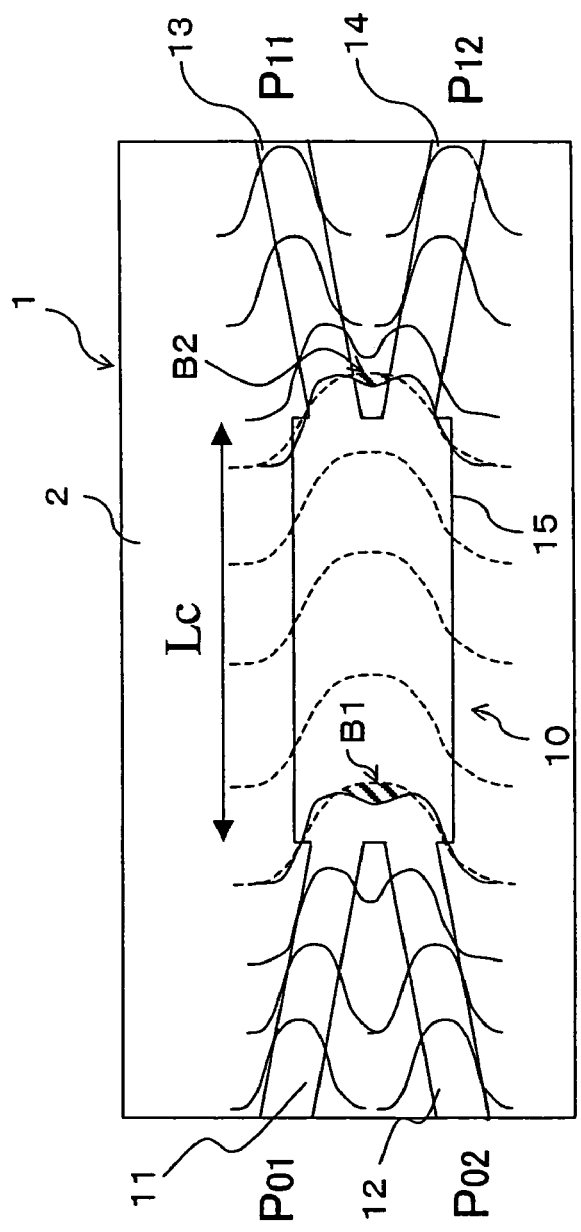
FIG. 4(a) is a schematic view showing a manner of interference in a waveguide coupling element of the optical waveguide device according to the first embodiment.
Figure 4B:
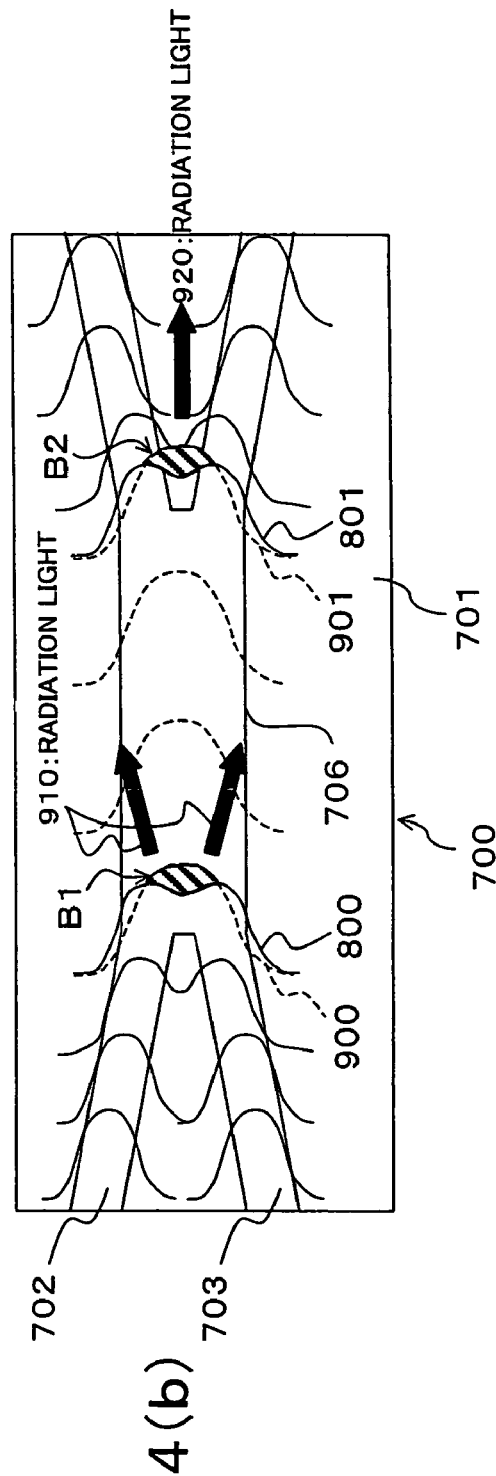
FIG. 4(b) is a schematic view showing a manner of interference in a waveguide coupling element of an optical multiplexer/demultiplexer shown in FIG. 16.

FIG. 4(*a*) is a schematic view illustrating a manner of interference in the waveguide coupling element 15 where lights $P_{O1}$ and $P_{O2}$ having the same phase are inputted to the input waveguides 11 and 12 of the optical waveguide device 1 according to the first embodiment, respectively, and FIG. 4(*b*) is a schematic view illustrating a manner of interference in the waveguide coupling element 706 where such lights $P_{O1}$ and $P_{O2}$ are inputted to the input waveguides 702 and 703 of the optical multiplexer/demultiplexer 700 shown in FIG. 16, respectively.

Figure 5A:
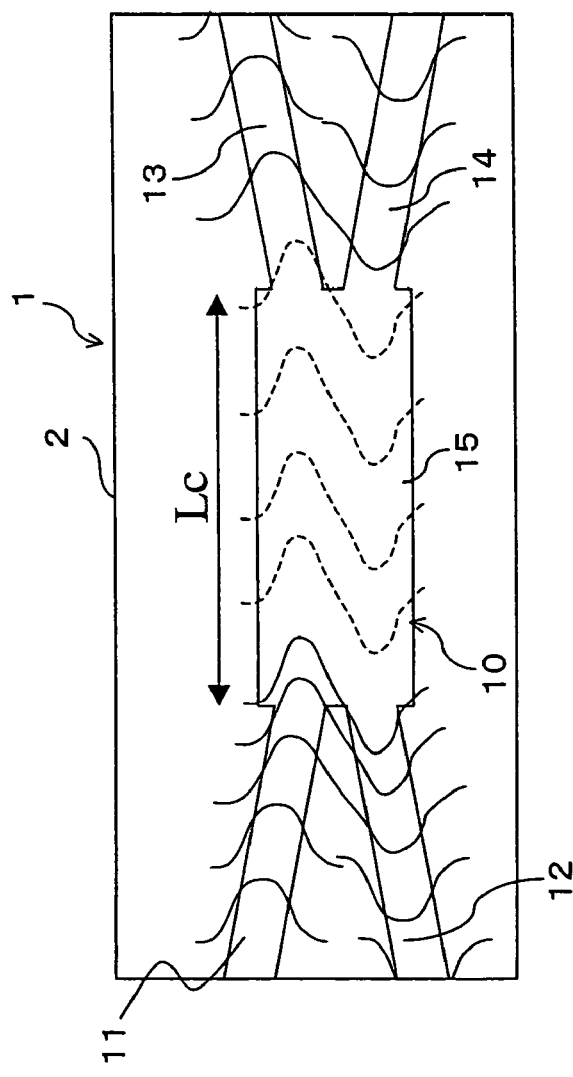
FIG. 5(a) is a schematic view showing a manner of interference in a waveguide coupling element of the optical waveguide device according to the first embodiment.
Figure 5B:
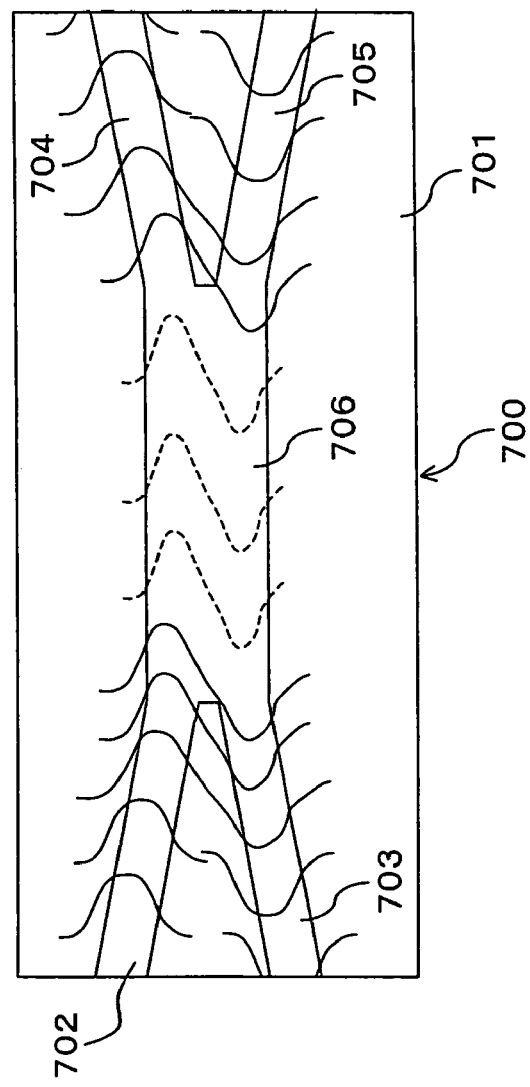
FIG. 5(b) is a schematic view showing a manner of interference in a waveguide coupling element of an optical multiplexer/demultiplexer shown in FIG. 16.

Meanwhile, FIG. 5(*a*) is a schematic view illustrating a manner of interference in the waveguide coupling element 15 where lights $P_{O3}$ and $P_{O4}$ having the opposite phases to each other are inputted to the input waveguides 11 and 12 of the optical waveguide device 1 according to the first embodiment, respectively, and FIG. 5(*b*) is a schematic view illustrating a manner of interference in the waveguide coupling element 706 where such lights $P_{O3}$ and $P_{O4}$ are inputted to the input waveguides 702 and 703 of the optical multiplexer/demultiplexer 700 shown in FIG. 16, respectively.

By combinations including the phase relations where light inputs to the two input waveguides 11 and 12 are the same phase inputs and they are the opposite phase inputs seen in FIGS. 4(*a*) and 5(*a*) [or FIGS. 4(*b*) and 5(*b*)], all light input methods to the two input waveguides 11 and 12 can be represented. Here, where the light inputs are the same phase inputs, 0th-order mode light is excited in the waveguide coupling element 15 at the center, but where the light inputs are the opposite phase inputs, first-order mode light is excited in the waveguide coupling element 15.

Here, as shown in FIGS. 5(*a*) and 5(*b*), in both of the optical waveguide device 1 according to the present embodiment and the conventional optical multiplexer/demultiplexer 700, where lights are inputted with the opposite phases to each other to the two input waveguides 11 and 12 (in the optical multiplexer/demultiplexer 700, to the input waveguides 702 and 703), the mode of light is smoothly changed from the input waveguide to the waveguide coupling element.

In contrast, where lights are inputted with the same phases as each other to the two input waveguides 11 and 12 (in the optical multiplexer/demultiplexer 700, to the input waveguides 702 and 703), as seen from FIGS. 4(*a*) and 4(*b*), radiation light appears only in the optical multiplexer/demultiplexer 700.

In particular, at a connection section B1 of the input waveguides 702 and 703 and the waveguide coupling element 706, the shape 800 of the light mode shape has two peaks with regard to the input waveguides 702 and 703, but the shape 900 of the light mode has one peak with regard to the waveguide coupling element 706. Therefore, a mode mismatch [refer to a slanting line area in the connection section B1 of FIG. 4(*b*)] occurs and radiation light 910 is generated.

Similarly, at a connection section B2 of the waveguide coupling element 706 and the output waveguides 703 and 704, the shape 801 of the light mode has two peaks with regard to the output waveguides 703 and 704, but the shape 901 of the light mode has one peak with regard to the waveguide coupling element 706. Therefore, a mode mismatch [refer to a slanting line area in the connection section B2 of FIG. 4(*b*)] occurs and radiation light 920 is generated.

In the waveguide structure shown in FIG. 4(*b*), the degree of the mode mismatch is high, and loss by generation of the radiation lights 910 and 920 occurs. However, if the width of the waveguide coupling element 15 is widened as in the structure of the optical waveguide device 1 in the first embodiment shown in FIG. 4(*a*), then the electric field distribution of the 0th-order mode light is widened, and consequently, the degree of the mode mismatch at each of the connection sections B1 and B2 is decreased [refer to slanting line areas in the connection sections B1 and B2 of FIG. 4(*a*)]. Consequently, loss by generation of radiation light is suppressed significantly.

In particular, if the width $w_{w1}$ of the waveguide coupling element 15 on the input waveguides 11 and 12 side is set to a value approximately 2.5 times to 3.5 times the width $w_{O1}$ of the input waveguides 11 and 12, then the electric field distribution of 0th-order mode light in the connection section B1 can be widened effectively, and consequently, the degree of the mode mismatch can be suppressed low.

Further, if the width $w_{w2}$ of the waveguide coupling element 15 on the output waveguides 13 and 14 side is set to a value approximately 2.5 times to 3.5 times the width $w_{O2}$ of the output waveguides 13 and 14, then the electric field distribution of 0th-order mode light in the connection section B2 can be widened effectively, and consequently, the degree of the mode mismatch can be suppressed low.

Further, by varying the length Lc of the waveguide coupling element 15 described above, the phase difference φ between the 0th-order mode light and the 1st-order mode light excited as described above can be varied, and as a result, the branching ratio of the output waveguides 13 and 14 can be varied. For example, if the phase difference Ψo between the same phase in put and the opposite phase input is 0 degree, that is, the inputs have the same phase and the phase difference φ between the 0th-order mode light and the 1st-order mode light in the waveguide coupling element 15 is 0 degree, that is, the lights have the same phase and then they are added to each other, then the input of light is only light $P_{O1}$ from the input waveguide 11, and the output of light is only light $P_{11}$ from the output waveguide 13.

Further, where the phase difference Ψo between the same phase input and the opposite phase input is Ψo=0 degree and the phase difference φ between the 0th-order mode light and the 1st-order mode light in the waveguide coupling element 15 is φ=90 degree, the light inputted from the input waveguide 11 is outputted with a branching ratio of 1:1 to the two output waveguides 13 and 14.

In this manner, with the optical waveguide device 1 according to the first embodiment of the present invention, since the width on the input side of the waveguide coupling element 15 is greater than that of the two input waveguides 11 and 12 and the width on the output side of the waveguide coupling element 15 is greater than that of the two output waveguides 13 and 14, there is an advantage that appearance of radiation mode light on the incoming and outgoing sides in the waveguide coupling element 15 is suppressed and performances as a device can be improved.

It is to be noted that, in the optical waveguide device 1 according to the first embodiment described above, the distance $d_1$ in the waveguide coupling element 15 is set to one half or less of the width $w_{o1}$ of the portion at which each of the input waveguides 11 and 12 is connected to the waveguide coupling element 15 and the width $w_{w1}$ of the waveguide coupling element 15 on the input waveguides 11 and 12 side is set to 2.5 times to 3.5 times the width $w_{o1}$ just described, and further, the distance $d_2$ in the waveguide coupling element 15 is set to one half or less of the width $w_{o2}$ at the portion at which each of the output waveguides 13 and 14 is connected to the waveguide coupling element 15 and the width $w_{w2}$ of the waveguide coupling element 15 on the output waveguides 13 and 14 side is set to 2.5 times to 3.5 times the width $w_{o2}$ just described. However, the present invention is not limited to this, but also the characteristic width of the present invention can be given only to the width of the waveguide coupling element 15 on the input waveguides 11 and 12 side or only to the width of the waveguide coupling element 15 on the output waveguides 13 and 14 side.

In particular, if the width of the waveguide coupling element 15 on the input waveguides 11 and 12 side has the characteristic width of the present invention, then generation of radiation mode light at least on the incoming side in the waveguide coupling element 15 can be suppressed. Meanwhile, if the width of the waveguide coupling element 15 on the output waveguides 13 and 14 side has the characteristic width of the present invention, then generation of radiation mode light at least on the outgoing side in the waveguide coupling element 15 can be suppressed.

Further, in the optical waveguide device 1 according to the first embodiment described above, while the distances $d_1$ and $d_2$, the widths $w_{o1}$ and $w_{o2}$, and the widths $w_{w1}$ and $w_{w2}$ are substantially equal to each other, according to the present invention, the scales just described can be set so as to differ from each other. Also in the case wherein the characteristic width of the present invention is given to the width of the waveguide coupling element 15 only on the input waveguides 11 and 12 side or to the width of the waveguide coupling element 15 only on the output waveguides 13 and 14 side, the scales just described can be set so as to differ from each other similarly as in the example described above.

Figure 6:
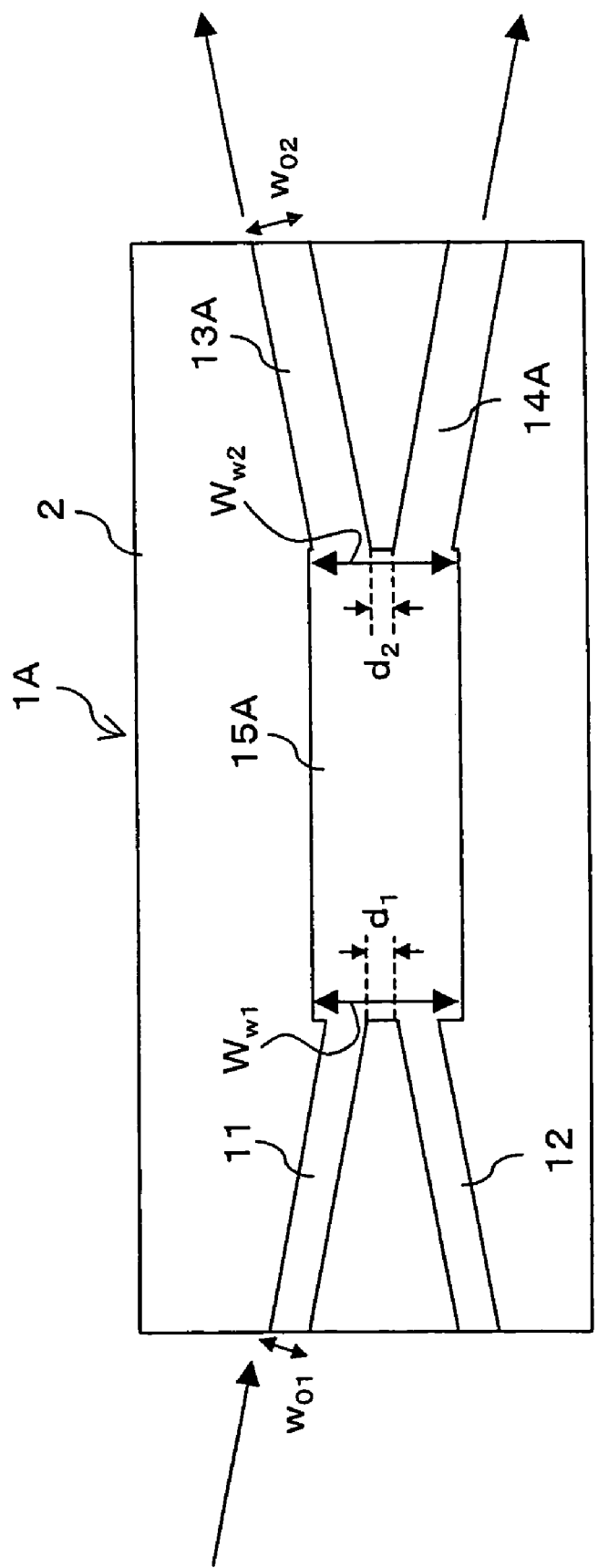
FIGS. 6 to 9 are schematic views showing optical devices according to modifications to the first embodiment of the present invention.

For example, also it is possible to configure the optical waveguide device such that, as in an optical waveguide device 1A shown in FIG. 6, the width $w_{o2}$ of output waveguides 13A and 14A is set greater than the width $w_{o1}$ of the input waveguides 11 and 12 ($w_{o2} > w_{o1}$) and the characteristic width of the present invention is given only to the width of a waveguide coupling element 15A on the input waveguides 11 and 12 side. In particular, as shown in FIG. 6, the distance $d_1$ in the waveguide coupling element 15 is set to one half or less of the width $w_{o1}$ of a portion at which each of the input waveguides 11 and 12 is connected to the waveguide coupling element 15A, and the width $w_{w1}$ of the waveguide coupling element 15A on the input waveguides 11 and 12 side is set to 2.5 times to 3.5 times the width $w_{o1}$ described above.

Figure 7:
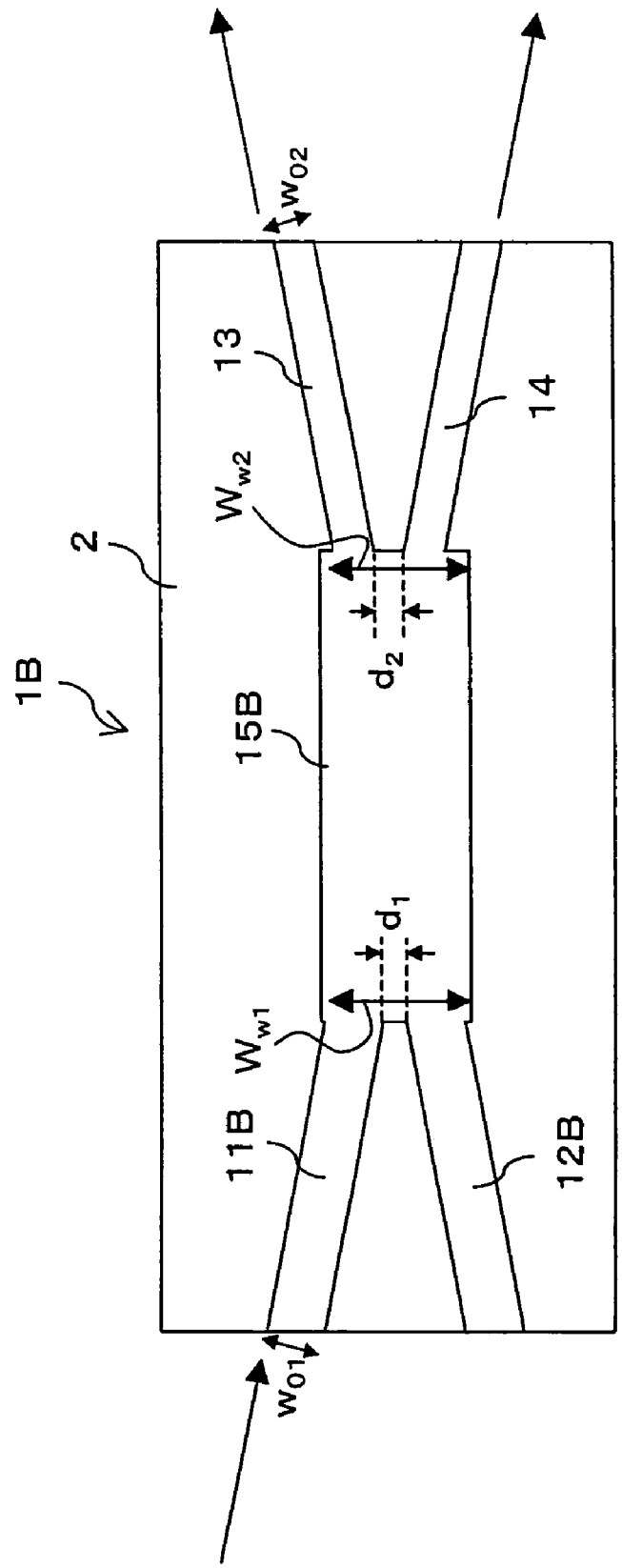

Further, also it is possible to configure the optical waveguide device such that, as in an optical waveguide device 1B shown in FIG. 7, the width $w_{o1}$ of input waveguides 11B and 12B is set greater than the width $w_{o2}$ of the output waveguides 13 and 14 ($w_{o1} > w_{o2}$), and the characteristic width of the present invention is given only to the width of a waveguide coupling element 15B on the output waveguides 13 and 14 side. In particular, the distance $d_2$ in the waveguide couple 15B is set to one half or less of the width $w_{o2}$ of a portion at which each of the output waveguides 13 and 14 is connected to the waveguide coupling element 15B, and the width $w_{w2}$ of the waveguide coupling element 15B on the output waveguides 13 and 14 side is set to 2.5 times to 3.5 times the width $w_{o2}$ described above.

Further, in the optical waveguide device 1 according to the first embodiment described above and the optical waveguide devices 1A and 1B shown in FIGS. 6 and 7, the waveguide coupling elements 15, 15A and 15B have a rectangular pattern having a fixed width ($w_{w1} = w_{w2}$). However, according to the present invention, also a trapezoidal pattern having a width ($w_{w1} \neq w_{w2}$) different between the input and output waveguides can be given to the waveguide coupling elements 15, 15A and 15B.

Figure 8:
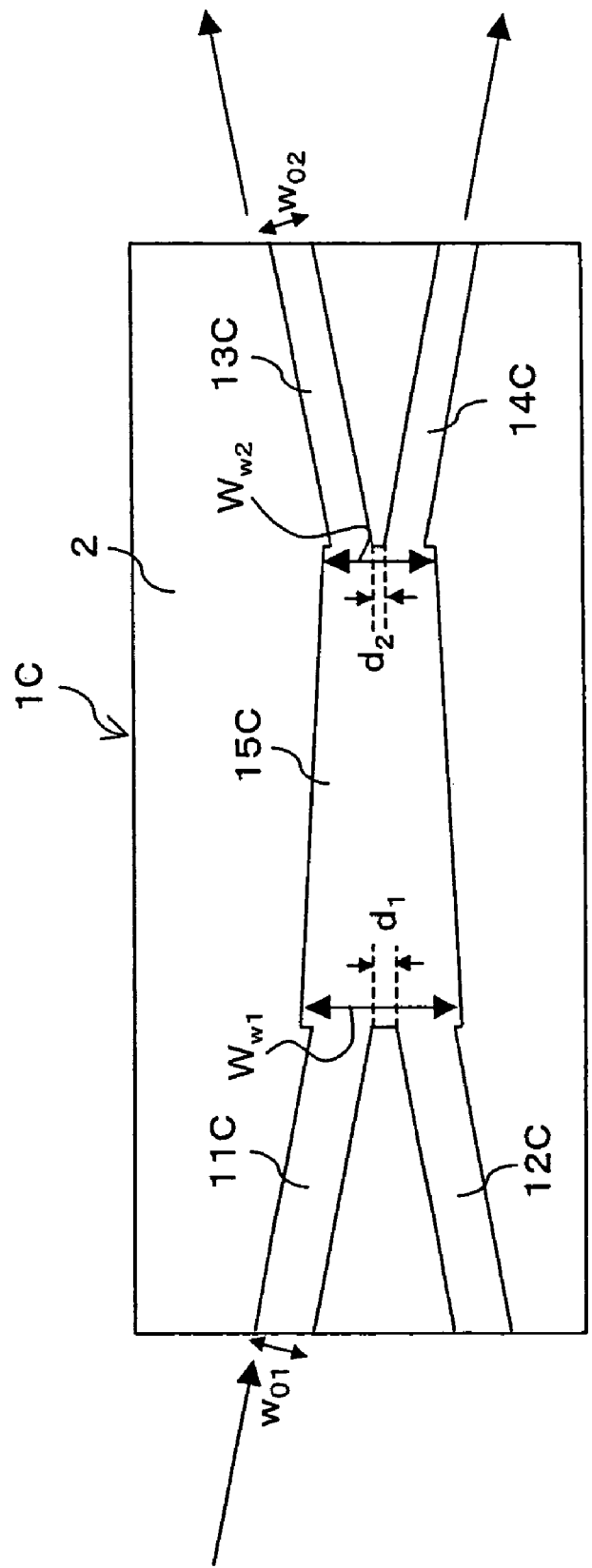

For example, also it is possible to configure the optical waveguide device such that, as in an optical waveguide device 1C shown in FIG. 8, the width $w_{o1}$ of input waveguides 11C and 12C is set greater than the width $w_{o2}$ of output waveguides 13C and 14C ($w_{o1} > w_{o2}$), and the characteristic width of the present invention is given to the width $w_{w1}$ of a waveguide coupling element 15C on the input waveguides 11C and 12C side and the width $w_{w2}$ of the waveguide coupling element 15B on the output waveguides 13 and 14 side while the widths are different from each other.

Figure 9:
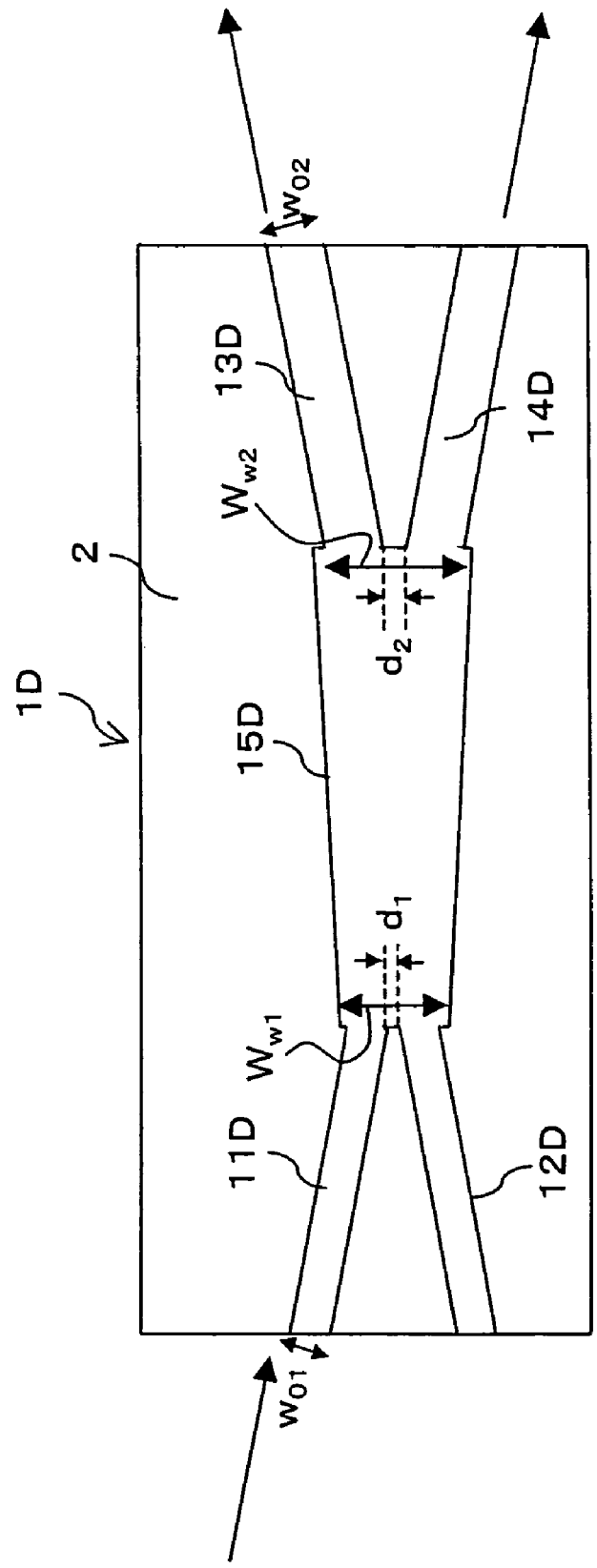

Further, also it is possible to configure the optical waveguide device such that, as in an optical waveguide device 1D shown in FIG. 9, the width $w_{o1}$ of input waveguides 11D and 12D is set smaller than the width $w_{o2}$ of output waveguides 13D and 14D ($w_{o1} < w_{o2}$), and the characteristic width of the present invention is given to the width $w_{w1}$ of a waveguide coupling element 15D on the input waveguides 11D and 12D side and the width $w_{w2}$ of the waveguide coupling element 15B on the output waveguides 13 and 14 side while the widths are different from each other.

It is to be noted that, in the case of FIG. 8 (or FIG. 9) described above, the distance $d_1$ in the waveguide coupling element 15C (15D) is set to one half or less of the width $w_{o1}$ of the portion at which each of the input waveguides 11C and 12C (11D and 12D) is connected to the waveguide coupling element 15C (15D), and the width $w_{w1}$ of the waveguide coupling element 15C (15D) on the input waveguides 11C and 12C (11D and 12D) side is set to 2.5 times to 3.5 times the width $w_{o1}$ described above. Further, the distance $d_2$ in the waveguide coupling element 15C (15D) is set to one half or less of the width $w_{o2}$ of the portion at which each of the output waveguides 13c and 14C (13D and 14D) is connected to the waveguide coupling element 15C (15D), and the width $w_{w2}$ of the waveguide coupling element 15C (15D) on the output waveguides 13C and 14C (13D and 14D) side is set to 2.5 times to 3.5 times the width $w_{o2}$ described above.

Further, in the optical waveguide device 1 according to the first embodiment described above, the input and output waveguides 11 to 14 are connected to the waveguide coupling element 15 with the opening angle θ of 0.5 degrees or more at the portions at which the input and output waveguides 11 to 14 are connected to the waveguide coupling element 15. However, according to the present invention, even if the opening angle just described is not given to the input and output waveguides 11 to 14, generation of radiation light at least on the incoming and outgoing sides of the waveguide coupling element 15 can be suppressed.

[B] Description of the Second Embodiment

Figure 10:
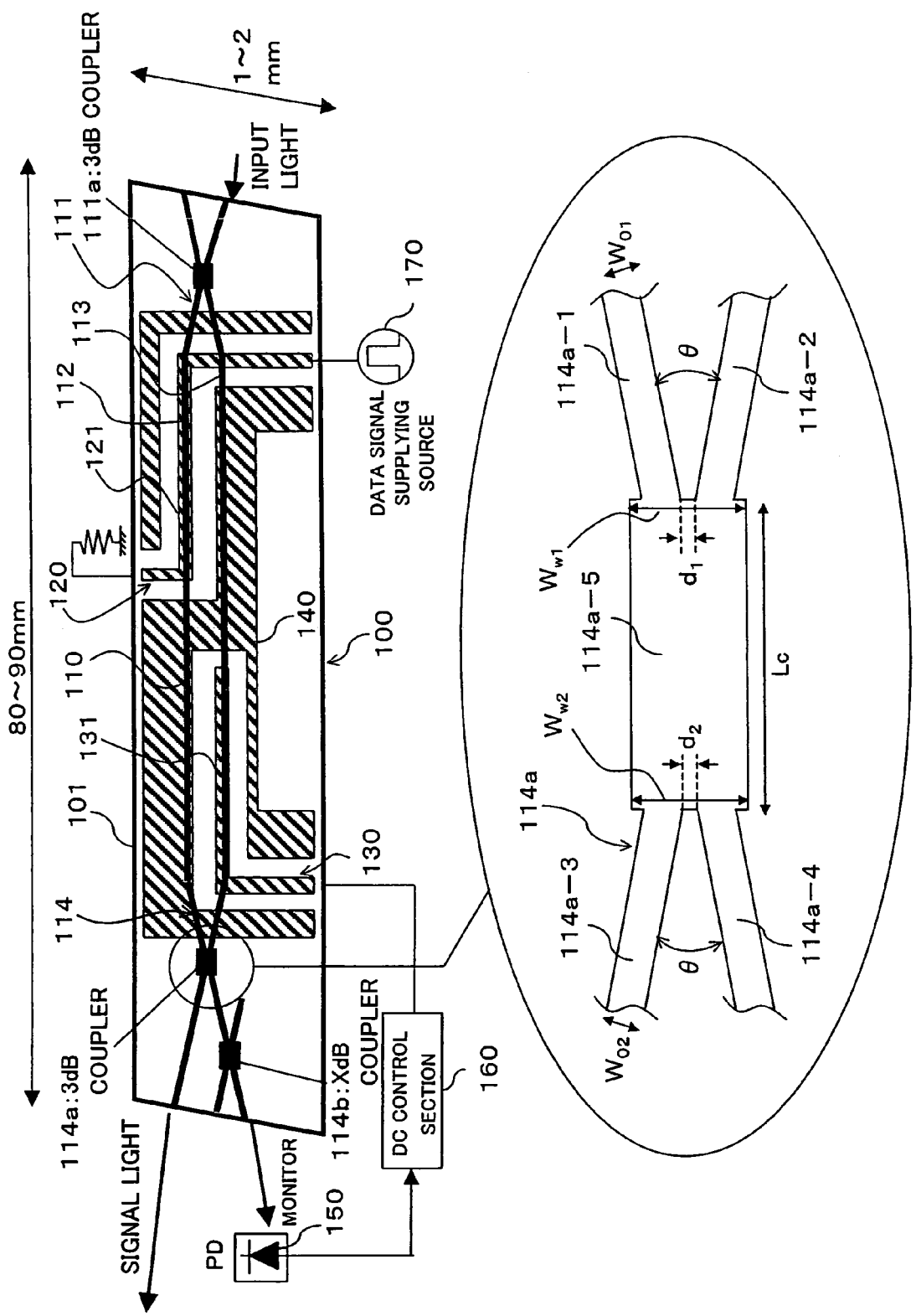
FIG. 10 is a schematic view showing an optical modulator according to a second embodiment of the present invention.

FIG. 10 is a schematic view showing an optical modulator according to a second embodiment of the present invention. In the optical modulator 100 shown in FIG. 10, reference numeral 101 denotes a substrate having an electro-optical effect and formed from lithium niobate or the like, and the substrate may have, for example, a width of 1 to 2 mm and a length of 80 to 90 mm in a longitudinal direction.

Further, reference numeral 110 denotes a Mach-Zehnder type optical waveguide mounted on the substrate 101. The Mach-Zehnder type optical waveguide 110 branches input light into two lights with a ratio of 1:1 and multiplexes the light modulated by a signal electrode section 120 and a bias electrode section 130 to output multiplexed light as modulated signal light, and includes a branching waveguide 111, linear waveguides 112 and 113 and a multiplexing waveguide 114.

Further, the branching waveguide 111 of the Mach-Zehnder type optical waveguide 110 branches inputted propagation light into two lights. The two linear waveguides 112 and 113 propagate the two propagation lights branched by the branching waveguide 111. The multiplexing waveguide 114 multiplexes the propagation lights from the two linear waveguides 112 and 113. Further, a 3 dB coupler 111a is formed on the branching waveguide 111, and a 3 dB coupler 114a and an X dB coupler 114b are formed on the multiplexing waveguide 114.

Here, the 3 dB coupler 111a branches the input light to the linear waveguides 112 and 113 with a ratio of 1:1. The coupler 114a multiplexes the lights propagating in the linear waveguides 112 and 113 and outputs the multiplexed light as a pair of complementary signals. The coupler 114a outputs one of the complementary signals as signal light and the other complementary signal as monitor light. Further, the coupler 114b further branches the monitor light branched by the coupler 114a and emits one of the branched lights to a monitor photodiode 150 side, and functions as an attenuator which attenuates the light intensity in order to supply monitor light to the monitor photodiode 150.

It is to be noted that the ratio (X dB) with which the light is attenuated at the coupler 114b is suitably adjusted as the light intensity to be supplied to the monitor photodiode 150.

Accordingly, the couplers 114a and 114b described above function as a coupler mounted on the outgoing side of the Mach-Zehnder type optical waveguide 110 for fetching the monitor light.

It is to be noted that the couplers 111a, 114a and 114b have a characteristic configuration according to the present invention hereinafter described.

Further, the signal electrode section 120 supplies a voltage from a data (DATA) signal supplying source 170 to the linear waveguides 112 and 113 and includes a signal electrode 121 and a ground electrode 140 connected to the data signal supplying source 170. In particular, an electric field of the linear waveguides 112 and 113 is varied by a voltage variation between the signal electrode 121 and the ground electrode 140 just described to modulate the lights which propagate in the linear waveguides 112 and 113.

Further, the bias electrode section 130 is mounted on the optical waveguide 110 in order to supply a bias voltage. In particular, the bias electrode 130 supplies a voltage from a DC (Direct Current) control section 160 to the linear waveguides 113 and 112 and includes a bias electrode 131 connected to the DC control section 160 and the ground electrode 140 for common use by the signal electrode section 120.

Further, the monitor photodiode 150 detects a light signal for monitoring fetched by the couplers 114a and 114b described above. The DC control section 160 functions as a bias voltage control section for controlling a bias voltage to be supplied to the bias electrode section 130 based on the light signal detected by the monitor photodiode 150.

Next, configurations of the couplers 111a, 114a and 114b are described in detail below.

All of the couplers 111a, 114a and 114b have, similarly to the optical waveguide device 1 in the first embodiment described above, the characteristic width according to the present invention. Here, taking notice of the coupler 114a, it includes two input waveguides 114a-1 and 114a-2, a wave guide coupling element 114a-5, and output couplers 114a-3 and 114a-4.

Here, each of the two input waveguides 114a-1 and 114a-2 receives light outputted from one of the linear waveguides 112 and 113 of the Mach-Zehnder type optical waveguide 110. In the optical modulator 100 according to the second embodiment, the input waveguide 114a-1 receives the light outputted from the linear waveguide 112, and the input waveguide 114a-2 receives the light outputted from the linear waveguide 113.

Further, the waveguide coupling element 114a-5 couples the two input waveguides 114a-1 and 114a-2 with a distance $d_1$ so that the lights propagated in the two input waveguides may interfere with each other. The output waveguides 114a-3 and 114a-4 are branched from the waveguide coupling element 114a-5 with another distance $d_2$. The output waveguide 114a-3 is used as an output waveguide for propagating the signal light, and the output waveguide 114a-4 is used as a monitoring output waveguide.

Here, the width on the input side of the waveguide coupling element 114a-5 is greater than the total width of the two input waveguides 114a-1 and 114a-2, and the width on the output side of the waveguide coupling element 114a-5 is greater than the total width of the two output waveguides 114a-3 and 114a-4.

Further, the distance $d_1$ in the waveguide coupling element 114a-5 is set to one half or less of the width $w_{o1}$ of a portion at which the input waveguide 114a-1 (or the input waveguide 114a-2) is connected to the waveguide coupling element 114a-5, and the width $w_{w1}$ of the waveguide coupling element on the input waveguides 114a-1 and 114a-2 side is set so as to have a width of 2.5 times to 3.5 times the width $w_{o1}$.

Similarly, the distance $d_2$ in the waveguide coupling element 114a-5 is set to one half or less of the width $w_{o2}$ of a portion at which the output waveguide 114a-3 (or the output waveguide 114a-4) is connected to the waveguide coupling element 114a-5, and the width $w_{w2}$ of the waveguide coupling element on the output waveguides 114a-3 and 114a-4 side is set so as to have a width of 2.5 times to 3.5 times the width $w_{o2}$.

Consequently, particularly in the 3 dB coupler 114a, similarly as in the case of the first embodiment described above, generation of radiation mode light when the lights from the linear waveguides 112 and 113 interfere with each other at the waveguide coupling element 114a-5 can be suppressed. Therefore, as hereinafter described, incoincidence between the voltage value $V_1$ when the signal light is in an on-state and the voltage value $V_2$ when the monitor light is in an off-state can be improved.

Further, in the 3 dB couplers 111a and 114a described above, the length Lc of the waveguide coupling element (for the case of the coupler 114a, refer to reference character 114a-5) is set so as to be equal to the length $L_2$ shown in FIG. 17 described above. In particular, the length of the waveguide coupling element (114a-5) is set so that the light which propagates in one of the two input waveguides (similarly refer to reference characters 114a-1 and 114a-2) is branched with a power ratio of 1:1 to the two output waveguides (similarly refer to reference characters 114a-3 and 114a-4).

Consequently, particularly in the 3 dB coupler 114a, the output waveguide 114a-3 from between the two output waveguides can be used as a waveguide for propagating the signal light, and the other output waveguide 114a-4 from between the two output waveguide can be used as a monitoring waveguide.

It is to be noted that the coupler 114b further branches the light fetched as monitor light by the 3 dB coupler 114a and supplies one of the branched lights to the monitor photodiode 150. Further, the length of the waveguide coupling element in the coupler 114b is set so that the branching ratio described above may be a branching ratio with which the branched light can be received with an optimum sensitivity by the monitor photodiode 150 in the next stage.

Further, also in the couplers 111a, 114a and 114b of the optical modulator 100 according to the present embodiment, the distances $d_1$ and $d_2$ described above are set substantially equal to each other, and the widths $w_{01}$ and $w_{02}$, and besides the widths $w_{w1}$ and $w_{w2}$ of the waveguide coupling element, are set substantially equal to each other. In addition, the input waveguides and the output waveguides are connected to the waveguide coupling element with an opening angle θ=0.5 degrees or more at portions at which they are connected to the waveguide coupling element.

By the configuration described above, in the optical modulator 100 according to the second embodiment of the present invention, a voltage of a data signal from the data signal supplying source 170 is applied to the signal electrode section 120 to modulate light which propagates in the Mach-Zehnder type optical waveguide 110 so that modulated light is outputted.

At this time, part of the modulated light fetched by the couplers 114a and 114b is received as monitor light by the monitor photodiode 150, and a bias voltage corresponding to the reception light signal is applied to the bias electrode section 130 through the DC control section 160. Consequently, operation of the modulated signal light is controlled.

Figure 11:
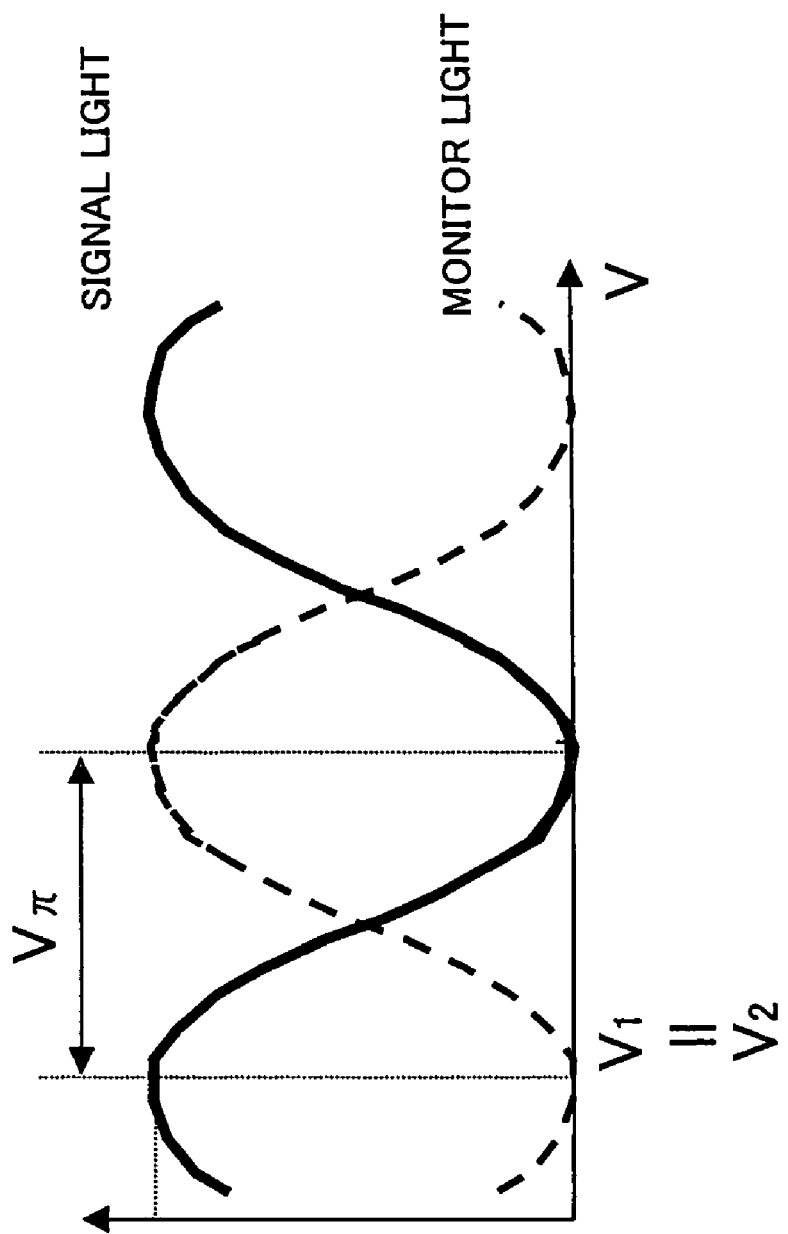
FIGS. 11 and 12 are views illustrating operation and effects of the second embodiment of the present invention.

Further, if, in the 3 dB coupler 114a on the outgoing side of the Mach-Zehnder type optical waveguide 110, the width on the incoming side (input waveguides 114a-1 and 114a-2 side) is set to the width $w_{w1}$ described above and the width on the outgoing side (output waveguides 114a-3 and 114a-4 side) is set to the width $w_{w2}$ described above, then generation of radiation mode light when the lights from the linear waveguides 112 and 113 interfere with each other at the waveguide coupling element 114a-5 can be suppressed. Consequently, as shown in FIG. 11, incoincidence between the voltage value $V_1$ when the signal light is in an on-state and the voltage value $V_2$ when the monitor light is in an off-state, that is, incoincidence of operating points, is eliminated.

If, for example, the widths of the input and output waveguides 114a-1 to 114a-4 are set to $w_{01}=w_{02}=7$ μm and the distances are set to $d_1=d_2=1$ μm, and further, an end portion in widthwise directions of the waveguide coupling element 114a-5 projects by approximately 2.5 μm from each of the outer edge portions of the input and output waveguides 114a-1 to 114a-4, then the width of the waveguide coupling element 114a-5 can be set to approximately 20 μm. With the configuration just described, the operating point displacement can be stably reduced independently of a device error, for example, as shown in FIG. 12.

Figure 12:
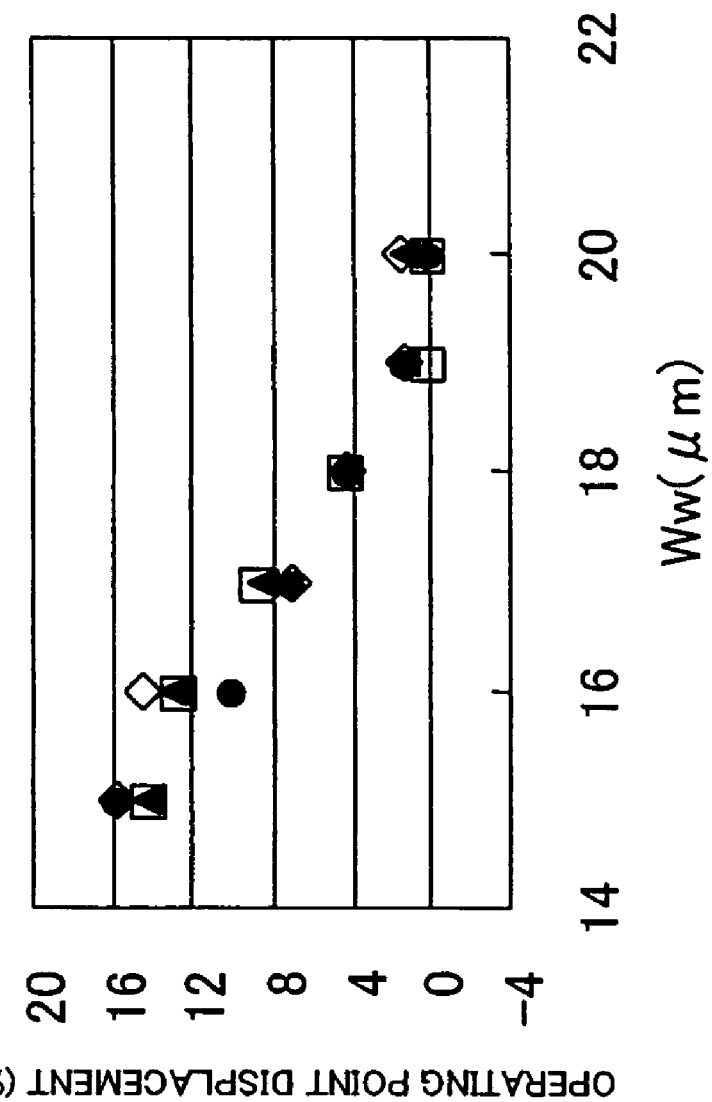

It is to be noted that FIG. 12 is a view for evaluation of a performance against the operating point displacement based on a plurality of prototype devices produced for different waveguide coupling element widths $w_w$, and four different plot patterns ([◊], [▲], [□], [●]) denote the different operating point displacements of the different devices. As shown in FIG. 12, if the widths $w_w$ of the waveguide coupling element 114a-5 are set to 19 to 20 μm, then device errors, that is, unique errors between devices when a plurality of devices are produced in the same conditions, can be suppressed to stably reduce the operating point displacements.

In this manner, with the optical modulator according to second embodiment of the present invention, since the 3 dB coupler 114a on the outgoing side of the Mach-Zehnder type optical waveguide 110 is configured such that the width of the incoming side (input waveguides 114a-1 and 114a-2 side) is set as the width $w_{w1}$ and the width of the outgoing side (output waveguides 114a-3 and 114a-4 side) is set as the width $w_{w2}$, generation of radiation mode light when the lights from the linear waveguides 112 and 113 interfere with each other at the waveguide coupling element 114a-5 can be suppressed. Consequently, there is an advantage that incoincidence between the operating points can be suppressed.

It is to be noted that, in the optical modulator 100 according to the second embodiment described above, the widths $w_{w1}$ and $w_{w2}$ of the incoming and outgoing sides of the waveguide coupling element in the three couplers 111a, 114a and 114b have the characteristic width of the present invention. However, the present invention is not limited to this, but the characteristic width of the present invention can be given, for example, only to the width of the waveguide coupling element on the input waveguides side or only to the width of the waveguide coupling element on the output waveguides side.

Further, in the three couplers 111a, 114a and 114b, while the distances $d_1$ and $d_2$ and the widths $w_{01}$ and $w_{02}$ and besides the widths $w_{w1}$ and $w_{w2}$ are substantially equal to each other, according to the present invention, they can be configured otherwise such that the scales of them suitably differ from each other. Also where the characteristic width of the present invention is given only to the width of the waveguide coupling element on the input waveguides side or only to the width of the waveguide coupling element on the output waveguides side, similarly as in the example just described, the scales described above can be set different from each other.

In this instance, at least the waveguide coupling element 114a-5 of the 3 dB coupler 114a as a synthesis waveguide can be configured such that the characteristic scale of the present invention is given to only the width $w_{w1}$ such that the width $w_{w1}$ is set to 2.5 times to 3.5 times the width $w_{01}$. Otherwise, the characteristic scale can be given only to the width $w_{w2}$ such that the width $w_{02}$ is set to 2.5 times to 3.5 times the width $w_{02}$.

Further, in the three couplers 111a, 114a and 114b, the input waveguides and output waveguides are connected to the waveguide coupling element with an opening angle θ of 0.5 degrees or more at the connecting portions. However, according to the present invention, even if such an opening angle as just described is not given, generation of radiation light at least on the incoming or outgoing side in the waveguide coupling element can be suppressed.

Further, in the optical modulator 100 according to the second embodiment described above, while the coupler 114b which functions as an attenuator is provided, according to the present invention, the optical modulator 100 may be configured otherwise such that the coupler 114b is omitted but the monitor light fetched by the coupler 114a is inputted to the monitor photodiode 150 using some other known attenuation element.

[B1] Modification to the Second Embodiment

Figure 13:
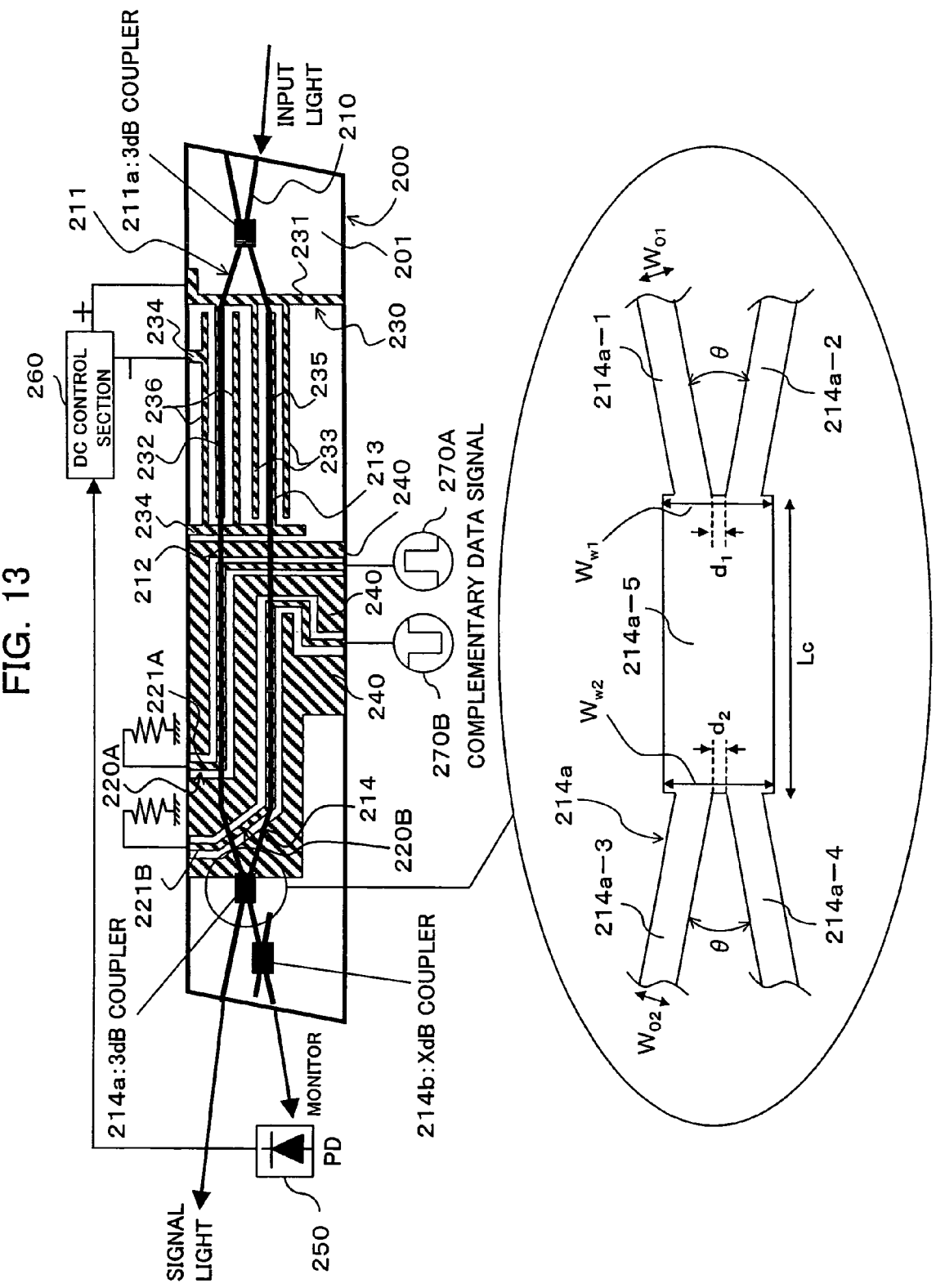
FIG. 13 is a schematic view showing an optical modulator according to a modification to the second embodiment of the present invention.

FIG. 13 is a schematic view showing an optical modulator according to a modification to the second embodiment of the present invention. While the optical modulator 200 shown in FIG. 13 is different from that described hereinabove with reference to FIG. 10 in that it includes signal electrode sections 220A and 220B of a dual configuration and includes a bias electrode section 230 of a different configuration, it is basically similar in the other configuration to the optical modulator 100 shown in FIG. 10.

In particular, also in the optical modulator 200 shown in FIG. 13, a Mach-Zehnder type optical waveguide 210 is formed on a substrate 201 having an electro-optical effect. The Mach-Zehnder type optical waveguide 210 includes a branching waveguide 211, linear waveguides 212 and 213 and a synthesis waveguide 214.

Here, the branching waveguide 211 of the Mach-Zehnder type optical waveguide 210 branches inputted propagation light into two lights. The two linear waveguides 212 and 213 propagate the propagation lights branched by the branching waveguide 211. The synthesis waveguide 214 synthesizes the propagation lights from the two linear waveguides 212 and 213.

Further, a 3 dB coupler 211a is formed on the branching waveguide 211, and another 3 dB coupler 214a and an X dB coupler 214b are formed on the synthesis waveguide 214. The 3 dB coupler 211a branches input light to the linear waveguides 212 and 213 with a branching ratio of 1:1. The couplers 214a and 214b function as a coupler provided on the outgoing side of the Mach-Zehnder type optical waveguide 210 for fetching monitor light.

It is to be noted that the couplers 211a, 214a and 214b are formed, similarly as in those (refer to reference characters 111a, 114a and 114b) shown in FIG. 10 described above, with such a characteristic width according to the present invention as hereinafter described.

Further, a monitor photodiode 250 detects a light signal of the monitor light fetched by the couplers 214a and 214b described above. A DC control section 260 functions as a bias voltage control section for controlling a bias voltage to be supplied to the bias electrode section 230 based on the light signal detected by the monitor photodiode 250.

Further, the signal electrode sections 220A and 220B of the dual configuration are supplied with data signals having a complementary relationship to each other from complementary data (DATA) signal supplying sources 270A and 270B, respectively. Thus, the signal electrode section 220A modulates light propagating in the linear waveguide 212, and the signal electrode section 220B modulates light propagating in the linear waveguide 213.

Further, the bias electrode section 230 includes first and second potential supplying electrode sections 231 and 234, first and second waveguide electrode sections 232 and 235 and potential difference producing electrode sections 233 and 236.

The DC control section 260 described above supplies a voltage for DC control as potential difference information of a negative side potential from a positive side potential. The first potential supplying electrode section 231 of the bias electrode section 230 is supplied with the positive side potential (first potential) just mentioned from the DC control section 260. The second potential supplying electrode section 234 is supplied with the negative side potential just described (second potential) from the DC control section 260.

Further, the first waveguide electrode section 232 supplies the potential from the first potential supplying electrode section 231 to the linear waveguide 212 from between the two linear waveguides 212 and 213. The second waveguide electrode section 235 supplies the potential from the second potential supplying electrode section 234 to the other linear waveguide 213.

Further, the two potential difference producing electrode sections 233 are provided in the proximity of the second waveguide electrode section 235 which supplies the potential from the second potential supplying electrode section 234 and supply the potential from the first potential supplying electrode section 231. Similarly, the two potential difference producing electrode sections 236 are provided in the proximity of the first waveguide electrode section 232 which supplies the potential from the first potential supplying electrode section 231 and supply the potential from the second potential supplying electrode section 234.

Configurations of the couplers 211a, 214a and 214b are described below in detail.

All of the couplers 211a, 214a and 214b described above have, similarly to the couplers 111a, 114a and 114b in the second embodiment described above, the characteristic width according to the present invention. Here, taking notice of the coupler 214a, it includes two input waveguides 214a-1 and 214a-2, a waveguide coupling element 214a-5 and two output waveguides 214a-3 and 214a-4.

Here, the two input waveguides 214a-1 and 214a-2 are supplied with the light from the Mach-Zehnder type optical waveguide 210. In the optical modulator 200 shown in FIG. 13, the input waveguide 214a-1 is supplied with the light from the linear waveguide 212, and the input waveguide 214a-2 is supplied with the light from the linear waveguide 213.

Further, the waveguide coupling element 214a-5 couples the two input waveguides 214a-1 and 214a-2 with the distance $d_1$ so that the lights propagating in the two input waveguides may interfere with each other. The output waveguides 214a-3 and 214a-4 are branched from the waveguide coupling element 214a-5 with the distance $d_2$. The output waveguide 214a-3 is used as an output waveguide for propagating the signal light, and the output waveguide 214a-4 is used as a monitoring output waveguide.

Here, the width on the input side of the waveguide coupling element 214a-5 is greater than the width of the two input waveguides 214a-1 and 214a-2, and the width on the output side of the waveguide coupling element 214a-5 is greater than the width of the two output waveguides 214a-3 and 214a-4.

Further, the distance $d_1$ in the waveguide coupling element 214a-5 is set to one half or less of the width $w_{o1}$ at a portion at which the input waveguide 214a-1 (or the input waveguide 214a-2) is connected to the waveguide coupling element 214a-5, and the width $w_{w1}$ of the waveguide coupling element 214a-5 on the input waveguides 214a-1 and 214a-2 side is set to 2.5 times to 3.5 times the width $w_{o1}$.

Similarly, the distance $d_2$ in the waveguide coupling element 214a-5 is set to one half or less of the width $w_{o2}$ at a portion at which the output waveguide 214a-3 (or the output waveguide 214a-4) is connected to the waveguide coupling element 214a-5, and the width $w_{w2}$ of the waveguide coupling element 214a-5 on the output waveguides 214a-1 and 214a-2 side is set to 2.5 times to 3.5 times the width $w_{o2}$.

Consequently, particularly in the 3 dB coupler 214a, similarly as in that in the first embodiment described above, generation of radiation mode light when the lights from the linear waveguides 212 and 213 interfere with each other at the waveguide coupling element 214a-5 can be suppressed. Therefore, as hereinafter described, the incoincidence between the voltage value $V_1$ when the signal light is in an on-state and the voltage value $V_2$ when the monitor light is in an off-state can be suppressed.

Further, in the 3 dB couplers 211a and 214a described above, the length Lc of the waveguide coupling element (for the case of the coupler 214a, refer to reference character 214a-5) is set so as to be equal to the length $L_2$ described hereinabove with reference to FIG. 17. In particular, the length of the waveguide coupling element (214a-5) is set so that the light which propagates in one of the two input waveguides (similarly refer to reference characters 214a-1 and 214a-2) is branched with a power ratio of 1:1 to the two output waveguides (similarly refer to reference characters 214a-3 and 214a-4).

Consequently, particularly in the 3 dB coupler 214a, the output waveguide 214a-3 from between the two output waveguides can be used as a waveguide for propagating the signal light, and the other output waveguide 214a-4 from between the two output waveguides can be used as a monitoring waveguide.

It is to be noted that the coupler 214b further branches the light fetched as monitor light by the 3 dB coupler 214a and supplies one of the branched lights to the monitor photodiode 250. Further, the length of the waveguide coupling element in the coupler 214b is set so that the branching ratio described above may be a branching ratio with which the branched light can be received with an optimum sensitivity by the monitor photodiode 250 in the next stage.

Further, also in the couplers 211a, 214a and 214b of the optical modulator 100 shown in FIG. 13, the distances $d_1$ and $d_2$ described above are set substantially equal to each other, and the widths $w_{o1}$ and $w_{o2}$, and besides the widths $w_{w1}$ and $w_{w2}$ of the waveguide coupling element, are set substantially equal to each other. Further, the input waveguides and the output waveguides are connected to the waveguide coupling element with an opening angle of θ=0.5 degrees or more at the portions at which they are connected to the waveguide coupling element.

By the configuration described above, in the optical modulator 200 shown in FIG. 13, the voltages of the complementary data signals from the data signal supplying sources 270A and 270B are applied to the signal electrode sections 220A and 220B, respectively, to modulate the lights propagating in the Mach-Zehnder type optical waveguide 210 so that the modulated lights are outputted.

At this time, part of the modulated lights fetched by the couplers 214a and 214b is received as monitor light by the monitor photodiode 250, and a bias voltage corresponding to the reception light signal is applied to the bias electrode section 230 through the DC control section 160. Consequently, operation of the modulated signal light is controlled.

Further, since the 3 dB coupler 214a on the outgoing side of the Mach-Zehnder type optical waveguide 210 is configured such that the width on the incoming side (input-waveguides 214a-1 and 214a-2 side) is set as the width $w_{w1}$ described above and the width on the outgoing side (output waveguides 214a-3 and 214a-4 side) is set as the width $w_{w2}$ described above, generation of radiation mode light when the lights from the linear waveguides 212 and 213 interfere with each other at the waveguide coupling element 214a-5 can be suppressed. Consequently, similarly as in that in the second embodiment described above, the incoincidence between the voltage value $V_1$ when the signal light is in an on-state and the voltage value $V_2$ when the monitor light is in an off-state, that is, incoincidence between the operating points, is suppressed.

Accordingly, also in the optical modulator 200 shown in FIG. 13, there is an advantage that, since the 3 dB coupler 214a on the outgoing side of the Mach-Zehnder type optical waveguide 210 is configured such that the width of the incoming side (input waveguides 214a-1 and 214a-2 side) is set as the width $w_{w1}$ described above and the width of the outgoing side (output waveguides 214a-3 and 214a-4 side) is set as the width $w_{w2}$ described above, generation of radiation mode light when the lights from the linear waveguides 212 and 213 interfere with each other at the waveguide coupling element 214a-5 can be suppressed, and as a result, the incoincidence between the operating points can be suppressed.

It is to be noted that also the optical modulator 200 shown in FIG. 13 can be carried out in various modified forms similarly to the optical modulator 100 (refer to FIG. 10) according to the second embodiment described hereinabove.

[C] Description of the Third Embodiment

Figure 14:
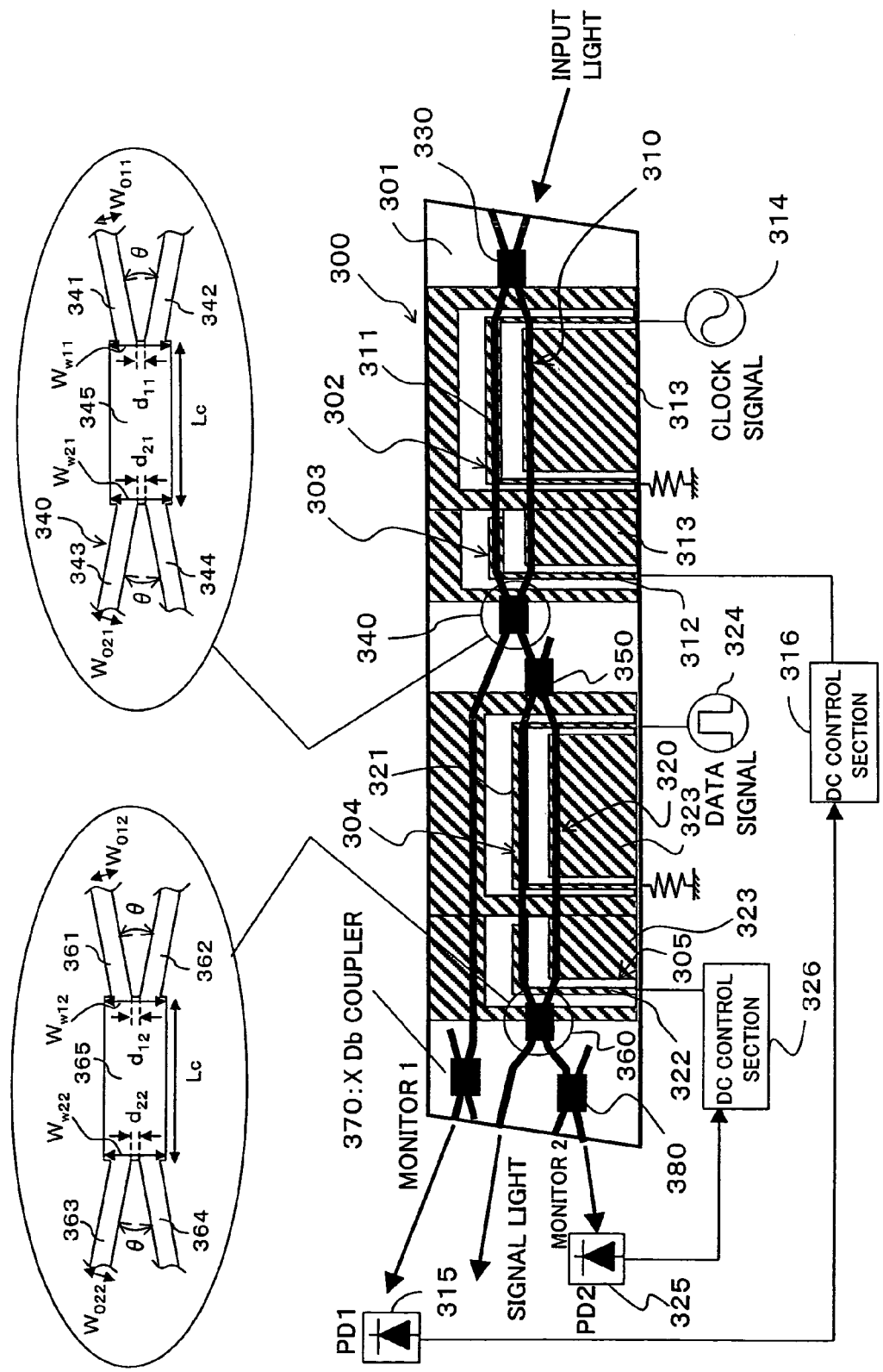
FIG. 14 is a block diagram showing an optical modulator according to a third embodiment of the present invention.

FIG. 14 is a block diagram showing an optical modulator according to a third embodiment of the present invention. In the optical modulator 300 shown in FIG. 14, when compared with the optical modulators 100 and 200 in the second embodiment described above, two Mach-Zehnder type optical waveguides 310 and 320 are formed in series on a single substrate 301 having an electro-optical effect. Further, the Mach-Zehnder type optical waveguide 310 is used for clock modulation, and the other Mach-Zehnder type optical waveguide 320 is used for data modulation.

Here, in the optical modulator 300 shown in FIG. 14, reference numeral 302 denotes a first signal electrode section. The first signal electrode section 302 is provided on the first Mach-Zehnder type optical waveguide 310 and is supplied with a clock signal, and includes a signal electrode 311 and a ground electrode 313. In particular, a clock signal source 314 is connected to the signal electrode 311 so that an electric signal representative of a clock signal is supplied from the clock signal source 314 to the signal electrode 311.

Further, reference numeral 304 denotes a second signal electrode section 304. The second signal electrode section 304 is provided on the second Mach-Zehnder type optical waveguide 320 and is supplied with a data signal, and includes a signal electrode 321 and a ground electrode 323. In particular, a data signal producing source 324 is connected to the signal electrode 321 so that an electric signal representative of a data signal is supplied from the data signal producing source 321.

Further, reference numeral 303 denotes a first bias electrode section. The first bias electrode section 303 is provided on the first Mach-Zehnder type optical waveguide 310 and is supplied with a bias voltage, and includes a bias electrode 312 and a ground electrode 313.

Further, reference numeral 305 denotes a second bias electrode section. The second bias electrode section 305 is provided on the second Mach-Zehnder type optical waveguide 320 and is supplied with a bias voltage, and includes a bias electrode 322 and a ground electrode 323.

Further, reference numeral 330 denotes a 3 dB coupler. The 3 dB coupler 330 functions as a branching waveguide on the incoming side which forms the Mach-Zehnder type optical waveguide 310 and branches input light to two linear waveguides, which form the Mach-Zehnder type optical waveguide 310, with a branching ratio of 1:1.

Further, also reference numeral 340 denotes a 3 dB coupler. The 3 dB coupler 340 functions as a synthesis waveguide on the out going side which forms the Mach-Zehnder type optical waveguide 310 and synthesizes lights propagating in the two linear waveguides which form the Mach-Zehnder type optical waveguide 310. The 3 dB coupler 340 outputs the synthesized light as a pair of complementary signals, and one of the complementary signals and the other of the complementary signals are outputted as signal light and monitor light, respectively.

Similarly, also reference numeral 350 denotes a 3 dB coupler. The 3 dB coupler 350 functions as a branching waveguide on the incoming side which forms the Mach-Zehnder type optical waveguide 320 and branches input light to the linear waveguides, which form the Mach-Zehnder type optical waveguide 320, with a branching ratio of 1:1.

Further, also reference numeral 360 denotes a 3 dB coupler. The 3 dB coupler 360 functions as a synthesis waveguide on the out going side which forms the Mach-Zehnder type optical waveguide 320 and synthesizes light propagating in the two linear waveguides which forms the Mach-Zehnder type optical waveguide 320. The 3 dB coupler outputs the synthesized light as a pair of complementary signals, and one of the complementary signals and the other of the complementary signals are outputted as signal light and monitor light, respectively.

Further, reference numeral 370 denotes an X dB coupler. The X dB coupler 370 further branches the monitor light branched by the coupler 340 with a desired ratio and emits part of the branched light as light attenuated by X dB to a monitor photodiode 315 side. In other words, the X dB coupler 370 functions as a first coupler provided on the outgoing side of the first Mach-Zehnder type optical waveguide 310 for fetching the monitor light.

Further, also reference numeral 380 denotes an X dB coupler. The X dB coupler 380 further branches the monitor light branched by the coupler 360 with a desired ratio and emits part of the branched light as light attenuated by X dB to a monitor photodiode 325 side. In other words, the X dB coupler 380 functions as a second coupler provided on the outgoing side of the second Mach-Zehnder type optical waveguide 320 for fetching the monitor light.

Further, the first monitor photodiode 315 detects a light signal of the monitor light fetched by the 3 dB coupler 340, and the second monitor photodiode 325 detects a light signal of the monitor light fetched by the 3 dB coupler 360.

Further, a DC (Direct Current) control section 316 serving as a first bias voltage control section controls a bias voltage to be supplied to the first bias electrode section 303 based on the light signal detected by the first monitor photodiode 315. Another DC control section 326 serving as a second bias voltage control section controls a bias voltage to be supplied to the second bias electrode section 305 based on the light signal detected by the second monitor photodiode.

Configurations of the couplers 330 to 380 are described below in detail.

All of the couplers 330 to 380 are formed, similarly to those in the optical waveguide device 1 in the first embodiment described above, with the characteristic width according to the present invention. Here, taking notice of the coupler 340, it includes two input waveguides 341 and 342, a waveguide coupling element 345 and two output waveguides 343 and 344.

Each of the two input waveguides 341 and 342 is supplied with one of different lights from the Mach-Zehnder type optical waveguide 310. In the optical modulator 300 according to the third embodiment, the input waveguide 341 receives light from a linear waveguide 310$b$, and the input waveguide 342 receives light from a linear waveguide 310$c$.

The waveguide coupling element 345 couples the two input waveguides 341 and 342 with the distance $d_{11}$ so that the lights propagating in the two input waveguides interfere with each other. The output waveguides 343 and 344 are branched from the waveguide coupling element 345 with the distance $d_{21}$. The output waveguide 343 is used as a signal light propagating output waveguide, and the output waveguide 344 is used as a monitoring output waveguide.

Here, the width on the input side of the waveguide coupling element 345 is greater than the total width of the two input waveguides 341 and 342, and the width on the output side of the waveguide coupling element 345 is greater than the total width of the two output waveguides 343 and 344.

Further, the distance $d_{11}$ in the waveguide coupling element 345 is set to one half or less of the width $w_{011}$ at a portion at which the input waveguide 341 (or the input waveguide 342) is connected to the waveguide coupling element 345, and the width $w_{w11}$ of the waveguide coupling element on the input waveguides 341 and 342 side described above is set to 2.5 times to 3.5 times the width $w_{011}$ just described.

Similarly, the distance $d_{21}$ in the waveguide coupling element 345 is set to one half or less of the width $w_{021}$ at a-portion at which the output waveguide 343 (or the output waveguide 344) is connected to the waveguide coupling element 345, and the width $w_{w21}$ of the waveguide coupling element on the output waveguides 343 and 344 side is set to 2.5 times to 3.5 times the width $w_{021}$ just described.

Further, taking notice of the coupler 360, it includes two input waveguides 361 and 362, a waveguide coupling element 365 and two output waveguides 363 and 364 which correspond to those (refer to reference numerals 341 to 345) of the coupler 340 described above.

Here, the waveguide coupling element 365 couples the two input waveguides 361 and 362 with the distance $d_{12}$ so that lights propagating in the two input waveguides interfere with each other. The output waveguides 363 and 364 are branched from the waveguide coupling element 365 with the distance $d_{22}$. The output waveguide 363 is used as a signal light propagating output waveguide, and the output waveguide 364 is used as a monitoring output waveguide.

Here, the width on the input side of the waveguide coupling element 365 is greater than the total width of the two input waveguides 361 and 362, and the width on the output side of the waveguide coupling element 365 is greater than the total width of the output waveguides 363 and 364.

Further, the distance $d_{12}$ in the waveguide coupling element 365 is set to one half or less of the width $w_{012}$ at a portion at which the input waveguide 361 (or the input waveguide 362) is connected to the waveguide coupling element 365, and the width $w_{w12}$ of the waveguide coupling element on the input waveguides 361 and 362 side described above is set to 2.5 times to 3.5 times the width $w_{012}$ just described.

Similarly, the distance $d_{22}$ in the waveguide coupling element 365 is set to one half or less of the width $w_{022}$ at a portion at which the output waveguide 363 (or the output waveguide 364) is connected to the waveguide coupling element 365, and the width $w_{w22}$ of the waveguide coupling element on the output waveguides 363 and 364 side is set to 2.5 times to 3.5 times the width $w_{o22}$ just described.

Consequently, particularly in each of the 3 dB couplers 340 and 360, generation of radiation mode light when the lights from the linear waveguides which form the Mach-Zehnder type optical waveguides 310 and 320 interfere with each other at the waveguide coupling elements 345 and 365 can be suppressed. Therefore, similarly as in the those of the second embodiment described above, incoincidence between the voltage value $V_1$ when the signal light is in an on-state and the voltage value $V_2$ when the monitor light is in an off-state can be suppressed.

Further, in the 3 dB couplers 330 to 360 described above, the length Lc of the waveguide coupling element (for the coupler 340, refer to reference numeral 345) is set to the length $L_2$ described hereinabove with reference to FIG. 17. In particular, the length of the waveguide coupling element (345) is set so that light propagating in one of the two input waveguides (similarly refer to reference numerals 341 and 342) may be branched to the two output waveguides (similarly refer to reference numerals 343 and 344) with a power ratio of 1:1.

Consequently, particularly in the 3 dB couplers 340 and 360 on the out going side of the Mach-Zehnder type optical waveguide 310 and 320, one of the output waveguides (for the 3 dB coupler 340, refer to reference numeral 344) can be used as a signal light propagating waveguide, and the other of the output waveguides (for the 3 dB coupler 340, refer to reference numeral 343) can be used as a monitoring waveguide.

It is to be noted that the coupler 370 further branches the light fetched as monitoring light by the 3 dB coupler 340 and supplies one of the branched lights to the monitor photodiode 315. Further, the length of the waveguide coupling element in the coupler 370 is set so that the branching ratio described above may be a branching ratio with which the branched light can be received with an optimum sensitivity by the monitor photodiode 315 in the next stage.

Similarly, the coupler 380 further branches the light fetched as monitoring light by the 3 dB coupler 360 and supplies one of the branched lights to the monitor photodiode 325. Further, the length of the waveguide coupling element in the coupler 380 is set so that the branching ratio described above may be a branching ratio with which the branched light can be received with an optimum sensitivity by the monitor photodiode 325 in the next stage.

Further, also in the couplers 330 to 380 of the optical modulator 300 according to the present embodiment, the distance on the input waveguides side and the distance on the output waveguides side described above are set substantially equal to each other, and the widths of the input and output waveguides, and besides the widths of the waveguide coupling element on the input and output sides, are set substantially equal to each other. In addition, the input waveguides and the output waveguides are connected to the waveguide coupling element with an opening angle of $\theta=0.5$ degrees or more at the connecting portions.

For example, the coupler 340 is configured such that the distances $d_{11}$ and $d_{21}$ described above are set substantially equal to each other, and the widths $w_{o11}$ and $w_{o21}$, and besides the widths $w_{w11}$ and $w_{w21}$ of the waveguide coupling element, are set substantially equal to each other. In addition, the input waveguide 341 and the output waveguide 342 are connected to the waveguide coupling element 345 with an opening angle of $\theta=0.5$ degrees or more at the connecting portions.

Further, the coupler 360 is configured such that the distances $d_{12}$ and $d_{22}$ described above are set substantially equal to each other, and the widths $w_{o12}$ and $w_{o23}$, and besides the widths $w_{w12}$ and $w_{w22}$ of the waveguide coupling element, are set substantially equal to each other. In addition, the input waveguides 361 and 362 and the output waveguides 363 and 364 are connected to the waveguide coupling element 365 with an opening angle of $\theta=0.5$ degrees or more at the connecting portions.

By the configuration described above, in the optical modulator 300 according to the third embodiment of the present invention, first, a voltage of a clock signal from the clock signal supplying source 314 is applied to the first signal electrode section 302 to modulate the light propagating in the first Mach-Zehnder type optical waveguide 310.

At this time, part of the modulated lights fetched by the couplers 340 and 370 is received as monitor light by the monitor photodiode 315, and a bias voltage corresponding to the reception light signal is applied to the first bias electrode section 303 through the DC control section 316. Consequently, operation of the modulated clock signal light is controlled.

Then, a voltage of a data signal from the data signal supplying source 324 is applied to the second signal electrode section 304 to modulate the light propagating in the second Mach-Zehnder type optical waveguide 320. Consequently, a signal with which the clock signal and the data signal are superposed and modulated is emitted as signal light.

At this time, part of the modulated lights fetched by the couplers 360 and 380 is received as monitor light by the monitor photodiode 325, and a bias voltage corresponding to the reception light signal is applied to the second bias electrode section 305 through the DC control section 326. Consequently, operation of the modulated signal light is controlled.

In other words, application of the bias voltage for controlling the operation of the signal light is performed for each of the modulation processes performed in the Mach-Zehnder type optical waveguides 310 and 320.

Further, in the 3 dB coupler 340 on the outgoing side of the first Mach-Zehnder type optical waveguide 310, the width on the incoming side (input waveguides 341 and 342 side) is set to the width $w_{w11}$ described above, and the width on the outgoing side (output waveguides 343 and 344 side) is set to the width $w_{w21}$ described above. Consequently, generation of radiation mode light when the lights from the linear waveguides which form the first Mach-Zehnder type optical waveguide 310 interfere with each other at the waveguide coupling element 345 is suppressed so that increase of the insertion loss of light may be suppressed.

Similarly, in the 3 dB coupler 360 on the outgoing side of the second Mach-Zehnder type optical waveguide 320, the width on the incoming side is set to the width $w_{w12}$ described above, and the width on the outgoing side is set to the width $w_{w22}$ described above. Consequently, generation of radiation mode light when the lights from the linear waveguides which form the second Mach-Zehnder type optical waveguide interfere with each other at the 3 dB coupler 360 is suppressed so that increasing of the insertion loss of light may be suppressed.

In this manner, with the optical modulator 300 according to the third embodiment of the present invention, there is an advantage that, since the widths on the incoming side of the 3 dB couplers 310 and 320 individually provided on the outgoing sides of the Mach-Zehnder type optical waveguides 310 and 320 are set to the widths $w_{w11}$ and $w_{w12}$ described above and the widths of the waveguide coupling elements on the outgoing side are set to the widths $w_{w21}$ and $w_{w22}$ described above, respectively, generation of radiation mode light when the propagating lights interfere with each other at the waveguide coupling element can be suppressed, and, similarly as in that of the second embodiment described above, incoincidence between the voltage value $V_1$ when the signal light is in an on-state and the voltage value $V_2$ when the monitor light is in an off-state, that is, disagreement of the operating points, can be suppressed.

It is to be noted that, in the optical modulator 300 according to the third embodiment described above, the widths $w_{w11}$ and $w_{w12}$ on the input side and the widths $w_{w21}$ and $w_{w22}$ on the output side of the waveguide coupling element in the couplers 330 to 380 have the characteristic width of the present invention. However, the present invention is not limited to this, but the characteristic width of the present invention can be given at least only to the width of the waveguide coupling element on the input waveguides side or only to the width of the waveguide coupling element on the output waveguides side.

Further, while, in the present embodiment, the couplers 330 to 380 are configured such that the widths $w_{o11}$ to $w_{o22}$ and the distances $d_{11}$ to $d_{22}$ of the input and output waveguides and the widths $w_{w11}$ to $w_{w22}$ of the waveguide coupling element are substantially equal to each other, according to the present invention, they can be configured otherwise such that the scales of them suitably differ from each other. Also where the characteristic width of the present invention is given only to the width of the waveguide coupling element on the input waveguides side or only to the width of the waveguide coupling element on the output waveguides side, similarly as in the example just described, the scales described above can be set different from each other.

In this instance, at least in the waveguide coupling elements 345 and 365 of the couplers 340 and 360 which form the multiplexing waveguides of the components of the Mach-Zehnder type optical waveguides 310 and 320, only the widths $w_{w11}$ and $w_{w12}$ can be selectively set to the characteristic scale of the present invention such that the widths $w_{w11}$ and $w_{12}$ are set to 2.5 times to 3.5 times the widths $w_{o11}$ and $w_{o12}$, respectively. Otherwise, only the widths $w_{w21}$ and $w_{w22}$ can be set to the characteristic scale of the present invention such that the widths $w_{w21}$ and $w_{w22}$ are set to 2.5 times to 3.5 times the widths $w_{o21}$ and $w_{o22}$, respectively.

Further, in each of the couplers 330 to 380, the input waveguides and the output waveguides are connected to the waveguide coupling element with the opening angle θ of 0.5 degrees or more at the connecting portions. However, according to the present invention, even if the opening angle just described is not given, generation of radiation light at least on the incoming side or the outgoing side of the waveguide coupling element can be suppressed.

Further, in the optical modulator 300 according to the third embodiment described above, the couplers 370 and 380 which function as an attenuator are provided. However, according to the present invention, the optical modulator 300 may be configured otherwise such that the couplers 370 and 380 are omitted but the monitor lights fetched by the couplers 340 and 360 are inputted to the monitor photodiodes 315 and 325, respectively, using some other known attenuation elements.

[D] Description of the Fourth Embodiment

Figure 15:
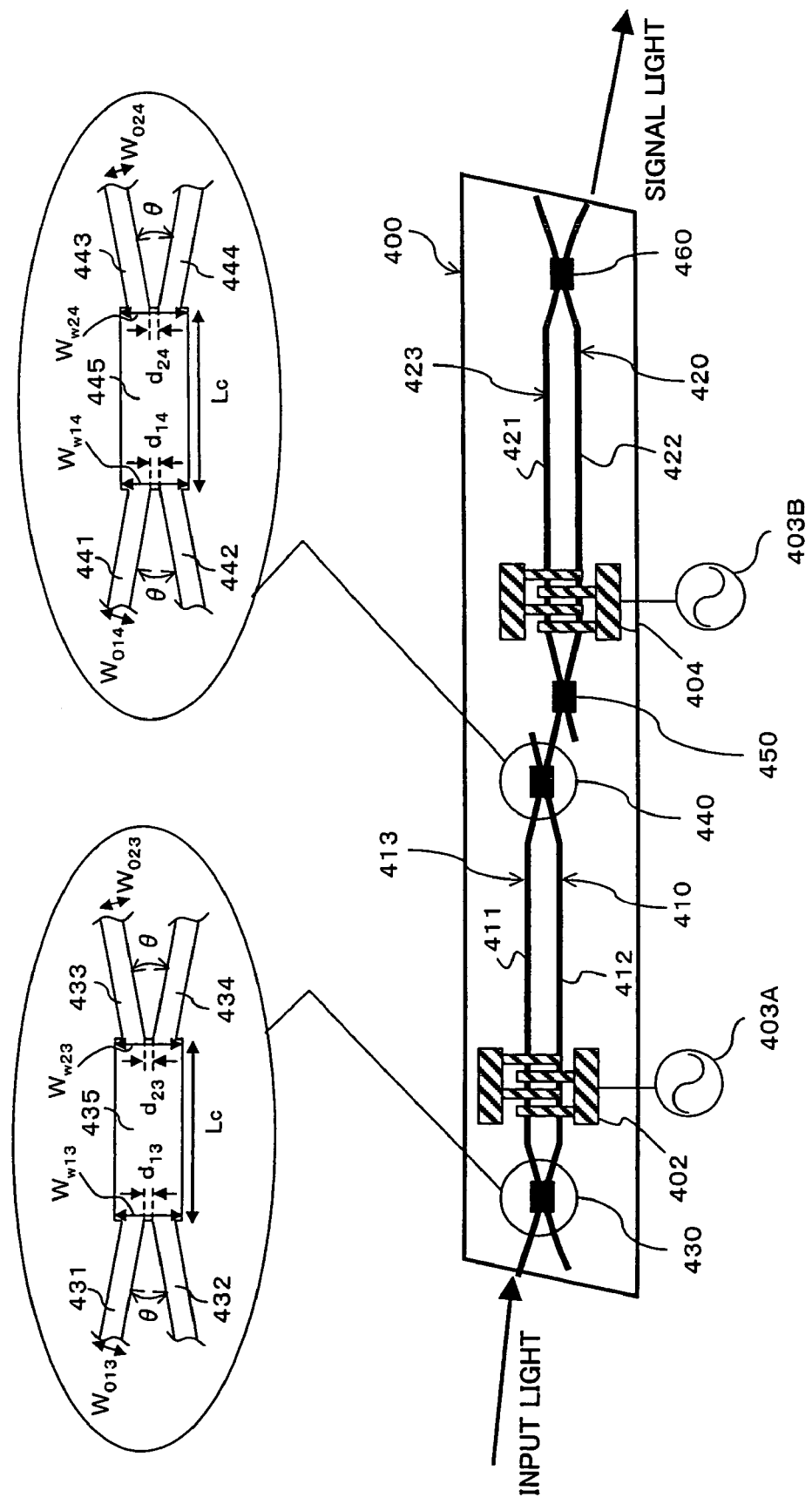
FIG. 15 is a block diagram showing an optical modulator according to a fourth embodiment of the present invention.

FIG. 15 is a block diagram showing an acousto-optical filter apparatus according to a fourth embodiment of the present invention. The acousto-optic tunable filter apparatus 400 shown in FIG. 15 includes first and second acousto-optic tunable filters 410 and 420 formed in series on a substrate 401.

The first acousto-optic tunable filter 410 includes an optical waveguide 413 and an electrode 402, and the second acousto-optic tunable filter 420 includes an optical waveguide 423 and an electrode 404. The optical waveguide 413 includes a polarization beam splitter 430, a pair of linear waveguides 411 and 412, and another polarization beam splitter 440. The optical waveguide 423 includes a polarization beam splitter 450, a pair of linear waveguides 421 and 422, and another polarization beam splitter 460.

The polarization beam splitter 430 polarizes and separates propagation light into polarization waves of polarization modes of TM and TE. The two linear waveguides 411 and 412 propagate the propagation lights polarized and separated by the polarization beam splitter 430, and the polarization beam splitter 440 synthesizes the polarization waves of the polarization lights from the linear waveguides 411 and 412.

Similarly, the polarization beam splitter 450 polarizes and separates the propagation light from the first acousto-optic tunable filter 410 into polarization waves of polarization modes of TM and TE. The two linear waveguides 421 and 422 propagate the propagation lights polarized and separated by the polarization beam splitter 450, and the polarization beam splitter 460 synthesizes the polarization waves of the polarization lights from the linear waveguides 421 and 422.

Furthermore, RF (Radio Frequency) signals for generating surface acoustic waves for an acousto-optic effect on the optical waveguides 413 and 423 are applied from RF signal sources 403A and 403B to the electrodes 402 and 404 of the first and second acousto-optic tunable filters 410 and 420, respectively.

Now, configurations of the polarization beam splitters 430 and 450 and the polarization beam splitters 440 and 460 described above are described in more detail.

The polarization beam splitters 430 and 450 and the polarization beam splitters 440 and 460 described above are formed with the characteristic width according to the present invention similarly to the optical waveguide device 1 in the first embodiment described hereinabove. First, taking notice of the polarization beam splitter 430, it includes two polarization wave separating input waveguides 431 and 432, a polarization wave separating waveguide coupling element 435, and two polarization wave separating output waveguides 433 and 434.

The polarization wave separating waveguide coupling element 435 couples the two polarization wave separating input waveguides 431 and 432 with a distance $d_{13}$ so that lights propagating in the two polarization wave separating input waveguides 431 and 432 may interfere with each other. Further, the polarization wave separating output waveguides 433 and 434 branch from the polarization wave separating waveguide coupling element 435 with a distance $d_{23}$.

Here, the width on the input side of the waveguide coupling element 435 is greater than the total width of the two input waveguides 431 and 432, and the width on the output side of waveguide coupling element 435 is greater than the total width of the two output waveguides 433 and 434.

Further, the distance $d_{13}$ described above is set to one half or less of the width $w_{o13}$ at a portion at which each of the polarization wave separating input waveguides 431 and 432 is connected to the polarization wave separating waveguide coupling element 435, and the width $w_{w13}$ of the polarization wave separating waveguide coupling element on the polarization wave separating input waveguides side is set to 2.5 times to 3.5 times the width $w_{01}$ described hereinabove. Furthermore, the distance $d_{23}$ described above is set to one half or less of the width $w_{023}$ at a portion at which each of the polarization wave separating output waveguides 433 and 434 is connected to the polarization wave separating waveguide coupling element 435, and the width $w_{w23}$ of the polarization wave separating waveguide coupling element on the polarization wave separating output waveguides side is set to 2.5 times to 3.5 times the width $w_{01}$ described hereinabove.

Taking notice of the polarization beam splitter 440, it includes a polarization beam splitter 440, two polarization wave synthesizing input waveguides 441 and 442, a polarization wave synthesizing waveguide coupling element 445, and two polarization wave synthesizing output waveguides 443 and 444.

The polarization wave synthesizing waveguide coupling element 445 couples the two polarization wave synthesizing input waveguides 441 and 442 with a distance $d_{14}$ so that lights propagating in the two polarization wave synthesizing input waveguides 441 and 442 may interfere with each other. Further, the polarization wave synthesizing output waveguides 443 and 444 branch from the polarization wave synthesizing waveguide coupling element 445 with a distance $d_{24}$.

Further, the distance $d_{14}$ described above is set to one half or less of the width $w_{014}$ at a portion at which each of the polarization wave synthesizing input waveguides 441 and 442 is connected to the polarization wave synthesizing waveguide coupling element 445, and the width $w_{w14}$ of the polarization wave synthesizing waveguide coupling element on the polarization wave synthesizing input waveguides side is set to 2.5 times to 3.5 times the width $w_{014}$ described above. Furthermore, the distance $d_{24}$ described above is set to one half or less of the width $w_{024}$ described above at a portion at which each of the polarization wave synthesizing output waveguides 443 and 444 is connected to the polarization wave synthesizing waveguide coupling element 445, and the width $w_{w24}$ of the polarization wave synthesizing waveguide coupling element on the polarization wave synthesizing output waveguides side is set to 2.5 times to 3.5 times the width $w_{024}$ described above.

Further, in the polarization beam splitters 430 and 450 described above, the length Lc of the waveguide coupling element (for the case of the polarization beam splitter 430, refer to reference character 435) is set so as to be equal to the length $L_2$ described hereinabove with reference to FIG. 2. In particular, the length of the waveguide coupling element (435) is set so that the light which propagates in one of the two input waveguides (similarly refer to reference characters 343 and 344) is polarized and separated to the two output waveguides (similarly refer to reference characters 343 and 344).

For example, in the polarization beam splitter 430, if light is inputted from the polarization wave separating input waveguide 431, then it is polarized and separated by the polarization wave separating polarization beam splitter 450 such that TM light can be emitted from the polarization wave separating output waveguide 433 while TE light is outputted from the polarization wave separating output waveguide 434.

Also each of the polarization beam splitters 430 and 450 of the acousto-optic tunable filter apparatus 400 according to the present embodiment is configured such that the distances $d_{13}$ and $d_{23}$ described above are set substantially equal to each other, and the widths $w_{013}$ and $w_{023}$, and besides the widths $w_{w13}$ and $w_{w23}$ of the waveguide coupling element, are set substantially equal to each other. In addition, the input waveguides and the output waveguides are connected to the waveguide coupling element with an opening angle of $\theta=0.5$ degrees or more at the connecting portions.

Furthermore, also each of the polarization beam splitters 430 and 450 is configured such that the distances $d_{14}$ and $d_{24}$ described above are set substantially equal to each other, and the widths $w_{014}$ and $w_{024}$, and besides the widths $w_{w14}$ and $w_{w24}$ of the waveguide coupling element, are set substantially equal to each other. In addition, the input waveguides and the output waveguides are connected to the waveguide coupling element with an opening angle of $\theta=0.5$ degrees or more at the connecting portions.

By the configuration described above, in the acousto-optic tunable filter apparatus 400 according to the fourth embodiment of the present invention, the first and second acousto-optic tunable filters 410 and 420 vary the refraction factors or the like of polarization waves propagating in the optical waveguides 413 and 423 with RF signals applied to the electrodes 402 and 404 to perform desired filter processing.

Further, since the polarization beam splitters 430 and 450 are configured such that the width on the incoming side (polarization wave separating input waveguides 431 and 432 side) is set to the width $w_{w13}$ described above and the width on the outgoing side (polarization wave separating output waveguides 433 and 434 side) is set to the width $w_{w23}$ described hereinabove and the polarization beam splitters 440 and 460 are configured such that the width on the incoming side (polarization wave synthesizing input waveguides 441 and 442 side) is set to the width $w_{w14}$ described hereinabove and the width on the outgoing side (polarization wave separating output waveguides 433 and 434 side) is set to the width $w_{w24}$ described herein above, generation of radio mode light in the polarization beam splitters 430 and 450 and the polarization beam splitters 440 and 460 is suppressed.

In this manner, with the acousto-optic tunable filter apparatus 400 according to the fourth embodiment of the present invention described above, since generation of radiation mode light can be suppressed by the polarization beam splitters 430 to 460, where the polarization beam splitters 430 to 460 are connected at multiple stages particularly as in the acousto-optic tunable filter apparatus 400, the extinction ratio of the polarization beam splitters connected in multiple stages can be improved.

It is to be noted that, in the optical modulator 400 according to the fourth embodiment described above, both of the widths $w_{w13}$ and $w_{w14}$ on the input side and the widths $w_{w23}$ and $w_{w24}$ on the output side of the waveguide coupling elements in the polarization beam splitters 430 to 460 have the characteristic width of the present invention. However, the present invention is not limited to this, but the characteristic width of the present invention can be given at least only to the width of the waveguide coupling element on the input waveguides side or only to the width of the waveguide coupling element on the output waveguides side.

Further, while, in the present embodiment, the polarization beam splitters 430 to 460 are each configured such that the widths $w_{011}$ to $w_{022}$ and the distances $d_{11}$ to $d_{22}$ of the input and output waveguides and the widths $w_{w11}$ to $w_{w22}$ of the waveguide coupling element are substantially equal to each other, according to the present invention, they can be configured otherwise such that the scales of them suitably differ from each other. Also where the characteristic width of the present invention is given only to the width of the waveguide coupling element on the input waveguides side or only to the width of the waveguide coupling element on the output waveguides side, the scales described above can be set different from each other similarly.

In this instance, at least in the waveguide coupling elements (for the polarization beam splitter 440, refer to reference numeral 445) of the polarization beam splitters 430 to 460 which form optical waveguides 413 and 423, only the widths $w_{w13}$ and $w_{w14}$ can be selectively set to the characteristic scale of the present invention such that the widths $w_{w13}$ and $w_{w14}$ are set to 2.5 times to 3.5 times the widths $w_{013}$ and $w_{014}$, respectively. Or else, only the widths $w_{w23}$ and $w_{w24}$ can be set to the characteristic scale of the present invention such that the widths $w_{w23}$ and $w_{w24}$ are set to 2.5 times to 3.5 times the widths $w_{023}$ and $w_{024}$, respectively.

Further, in each of the polarization beam splitters 430 to 460, the input waveguides and the output waveguides are connected to the waveguide coupling element with the opening angle θ of 0.5 degrees or more at the connecting portions. However, according to the present invention, even if the opening angle just described is not given to them, generation of radiation light at least on the incoming side or the outgoing side of the waveguide coupling element can be suppressed.

[E] Others

In the embodiments described above, a lithium niobate (LiNbO$_3$) waveguide is used for the optical waveguides. However, according to the present invention, the optical waveguides are not limited to this, but any other optical waveguide such as a glass substrate or semiconductor substrate may be used for the optical waveguides.

Particularly, in such an optical waveguide device or an optical modulator as in the first to third embodiments, the substrates 2 and 101 to 301 are not limited to those which have an electro-optic effect. In particular, in order to provide a phase difference between lights which propagate in different optical waveguides, the electro-optic effect need not necessarily be utilized, but, for example, where a SiO$_2$ substrate is used, such a phase difference between lights as described above can be provided by a thermo-optic effect.

Further, where the optical waveguide device 1 according to the first embodiment is formed as a polarization beam splitter or is applied as an acousto-optic tunable filter apparatus according to the fourth embodiment, in order to provide a difference in refractive index between TE and TM mode lights efficiently, a material having a high double refraction is selectively used for the substrate.

Furthermore, while, in the optical modulates according to the second and third embodiments described hereinabove, a bias voltage is applied to each of the bias electrodes 131, 231, 312 and 322, the present invention is not limited to this, but the optical modulations may be configured otherwise such that a bias voltage is superposed on and applied together with a signal voltage to a signal electrode.

Further, the optical device of the present invention can naturally be applied also to various devices other than such optical modulators and acousto-optic tunable filter apparatus as in the second to fourth embodiments described hereinabove.

The present invention is not limited to the embodiments specifically described above, and variations and modifications can be made without departing from the scope of the present invention.

What is claimed is:

1. An optical modulator, comprising:
   a substrate having an electro-optical effect;
   first and second Mach-Zehnder type optical waveguides formed in series on said substrate;
   a first signal electrode section provided on said first Mach-Zehnder type optical waveguide for being supplied with a clock signal;
   a second signal electrode section provided on said second Mach-Zehnder type optical waveguide for being supplied with a data signal;
   a first bias electrode section provided on said first Mach-Zehnder type optical waveguide for being supplied with a bias voltage;
   a second bias electrode section provided on said second Mach-Zehnder type optical waveguide for being supplied with another bias voltage;
   a first coupler provided on the outgoing side of said first Mach-Zehnder type optical waveguide for fetching monitor light;
   a second coupler provided on the outgoing side of said second Mach-Zehnder type optical waveguide for fetching monitor light;
   a first monitor photodiode for detecting a light signal of the monitor light fetched by said first coupler;
   a second monitor photodiode for detecting a light signal of the monitor light fetched by said second coupler;
   a first bias voltage control section for controlling the bias voltage to be supplied to said first bias electrode section based on the light signal detected by said first monitor photodiode; and
   a second bias voltage control section for controlling the bias voltage to be supplied to said second bias electrode section based on the light signal detected by said second monitor photodiode;
   said first coupler including two input waveguides through one of which light from said first Mach-Zehnder type optical waveguide is inputted, a waveguide coupling element for coupling said two input waveguides with a distance $d_{11}$, and two output waveguides branched from said waveguide coupling element with a distance $d_{21}$;
   the distance $d_{11}$ in said waveguide coupling element of said first coupler being set to less than one half of width $w_{011}$ at a portion at which each of said input waveguides is connected to said waveguide coupling element;
   width $w_{w11}$ of said waveguide coupling element on said input waveguides side being set to 2.5 times to 3.5 times the width $w_{011}$.

2. An optical modulator, comprising:
   a substrate having an electro-optical effect;
   first and second Mach-Zehnder type optical waveguides formed in series on said substrate;
   a first signal electrode section provided on said first Mach-Zehnder type optical waveguide for being supplied with a clock signal;
   a second signal electrode section provided on said second Mach-Zehnder type optical waveguide for being supplied with a data signal;
   a first bias electrode section provided on said first Mach-Zehnder type optical waveguide for being supplied with a bias voltage;

a second bias electrode section provided on said second Mach-Zehnder type optical waveguide for being supplied with another bias voltage;
a first coupler provided on the outgoing side of said first Mach-Zehnder type optical waveguide for fetching monitor light;
a second coupler provided on the outgoing side of said second Mach-Zehnder type optical waveguide for fetching monitor light;
a first monitor photodiode for detecting a light signal of the monitor light fetched by said first coupler;
a second monitor photodiode for detecting a light signal of the monitor light fetched by said second coupler;
a first bias voltage control section for controlling the bias voltage to be supplied to said first bias electrode section based on the light signal detected by said first monitor photodiode; and
a second bias voltage control section for controlling the bias voltage to be supplied to said second bias electrode section based on the light signal detected by said second monitor photodiode;
said first coupler including two input waveguides through one of which light from said first Mach-Zehnder type optical waveguide is inputted, a waveguide coupling element for coupling said two input waveguides with a distance $d_{11}$, and two output waveguides branched from said waveguide coupling element with a distance $d_{21}$;
the distance $d_{21}$ in said waveguide coupling element of said first coupler being set to less than one half of width $w_{021}$ at a portion at which each of said output waveguides is connected to said waveguide coupling element;
width $w_{w21}$ of said waveguide coupling element on said output waveguides side being set to 2.5 times to 3.5 times the width $w_{021}$.

3. An optical modulator, comprising:
a substrate having an electro-optical effect;
first and second Mach-Zehnder type optical waveguides formed in series on said substrate;
a first signal electrode section provided on said first Mach-Zehnder type optical waveguide for being supplied with a clock signal;
a second signal electrode section provided on said second Mach-Zehnder type optical waveguide for being supplied with a data signal;
a first bias electrode section provided on said first Mach-Zehnder type optical waveguide for being supplied with a bias voltage;
a second bias electrode section provided on said second Mach-Zehnder type optical waveguide for being supplied with another bias voltage;
a first coupler provided on the outgoing side of said first Mach-Zehnder type optical waveguide for fetching monitor light;
a second coupler provided on the outgoing side of said second Mach-Zehnder type optical waveguide for fetching monitor light;
a first monitor photodiode for detecting a light signal of the monitor light fetched by said first coupler;
a second monitor photodiode for detecting a light signal of the monitor light fetched by said second coupler;
a first bias voltage control section for controlling the bias voltage to be supplied to said first bias electrode section based on the light signal detected by said first monitor photodiode; and
a second bias voltage control section for controlling the bias voltage to be supplied to said second bias electrode section based on the light signal detected by said second monitor photodiode;
said second coupler including two input waveguides through one of which light from said second Mach-Zehnder type optical waveguide is inputted, a waveguide coupling element for coupling said two input waveguides with a distance $d_{12}$, and two output waveguides branched from said waveguide coupling element with a distance $d_{22}$;
the distance $d_{12}$ in said waveguide coupling element of said second coupler being set to less than one half of width $w_{012}$ at a portion at which said input waveguides are connected to said waveguide coupling element;
width $w_{w12}$ of said waveguide coupling element on said input waveguides side being set to 2.5 times to 3.5 times the width $w_{012}$.

4. An optical modulator, comprising:
a substrate having an electro-optical effect;
first and second Mach-Zehnder type optical waveguides formed in series on said substrate;
a first signal electrode section provided on said first Mach-Zehnder type optical waveguide for being supplied with a clock signal;
a second signal electrode section provided on said second Mach-Zehnder type optical waveguide for being supplied with a data signal;
a first bias electrode section provided on said first Mach-Zehnder type optical waveguide for being supplied with a bias voltage;
a second bias electrode section provided on said second Mach-Zehnder type optical waveguide for being supplied with another bias voltage;
a first coupler provided on the outgoing side of said first Mach-Zehnder type optical waveguide for fetching monitor light;
a second coupler provided on the outgoing side of said second Mach-Zehnder type optical waveguide for fetching monitor light;
a first monitor photodiode for detecting a light signal of the monitor light fetched by said first coupler;
a second monitor photodiode for detecting a light signal of the monitor light fetched by said second coupler;
a first bias voltage control section for controlling the bias voltage to be supplied to said first bias electrode section based on the light signal detected by said first monitor photodiode; and
a second bias voltage control section for controlling the bias voltage to be supplied to said second bias electrode section based on the light signal detected by said second monitor photodiode;
said second coupler including two input waveguides through one of which light from said second Mach-Zehnder type optical waveguide is inputted, a waveguide coupling element for coupling said two input waveguides with a distance $d_{12}$, and two output waveguides branched from said waveguide coupling element with a distance $d_{22}$;
the distance $d_{22}$ in said waveguide coupling element of said second coupler being set to less than one half of width $w_{022}$ at a portion at which each of said output waveguides is connected to said waveguide coupling element;
width $w_{w22}$ of said waveguide coupling element on said output waveguides side being set to 2.5 times to 3.5 times the width $w_{022}$.

5. An optical modulator, comprising:
a substrate having an electro-optical effect;

first and second Mach-Zehnder type optical waveguides formed in series on said substrate;

a first signal electrode section provided on said first Mach-Zehnder type optical waveguide for being supplied with a clock signal;

a second signal electrode section provided on said second Mach-Zehnder type optical waveguide for being supplied with a data signal;

a first bias electrode section provided on said first Mach-Zehnder type optical waveguide for being supplied with a bias voltage;

a second bias electrode section provided on said second Mach-Zehnder type optical waveguide for being supplied with another bias voltage;

a first coupler provided on the outgoing side of said first Mach-Zehnder type optical waveguide for fetching monitor light;

a second coupler provided on the outgoing side of said second Mach-Zehnder type optical waveguide for fetching monitor light;

a first monitor photodiode for detecting a light signal of the monitor light fetched by said first coupler;

a second monitor photodiode for detecting a light signal of the monitor light fetched by said second coupler;

a first bias voltage control section for controlling the bias voltage to be supplied to said first bias electrode section based on the light signal detected by said first monitor photodiode; and a second bias voltage control section for controlling the bias voltage to be supplied to said second bias electrode section based on the light signal detected by said second monitor photodiode;

said first coupler including two first input waveguides through one of which light from said first Mach-Zehnder type optical waveguide is inputted, a first waveguide coupling element for coupling said two first input waveguides with a distance $d_{11}$, and two first output waveguides branched from said first waveguide coupling element with a distance $d_{21}$;

said second coupler including two second input waveguides through one of which light from said second Mach-Zehnder type optical waveguide is inputted, a second waveguide coupling element for coupling said two second input waveguides with a distance $d_{12}$, and two second output waveguides branched from said second waveguide coupling element with a distance $d_{22}$;

the distances $d_{11}$ and $d_{21}$ in said first waveguide coupling element of said first coupler being set to less than one half of widths $w_{o1}$, and $w_{o21}$ at portions at which each of said first input waveguides and each of said first output waveguides are connected to said first waveguide coupling element, respectively;

the widths $w_{w11}$ and $w_{w21}$ of said first waveguide coupling element on said first input waveguides side and said first output waveguides side being set to 2.5 times to 3.5 times the widths $w_{o11}$ and $w_{o21}$, respectively;

the distances $d_{12}$ and $d_{22}$ in said second waveguide coupling element of said second coupler being set to less than one half of widths $w_{o12}$ and $w_{o22}$ at portions at which each of said second input waveguides and each of said second output waveguides are connected to said second waveguide coupling element, respectively;

the widths $w_{w12}$ and $w_{w22}$ of said second waveguide coupling element on said second input waveguides side and said second output waveguides side being set to 2.5 times to 3.5 times the widths $w_{o12}$ and $w_{o22}$, respectively.

6. The optical modulator as claimed in claim 1, wherein the length of said first waveguide coupling element is set so that said two first output waveguides in said first coupler may branch the light from said first waveguide coupling element with a power ratio of 1:1 without depending upon the polarization, and one of said two first output waveguides is used as a signal light propagating waveguide while the other of said two first output waveguides is used as a monitoring waveguide.

7. The optical modulator as claimed in claim 2, wherein the length of said first waveguide coupling element is set so that said two first output waveguides in said first coupler may branch the light from said first waveguide coupling element with a power ratio of 1:1 without depending upon the polarization, and one of said two first output waveguides is used as a signal light propagating waveguide while the other of said two first output waveguides is used as a monitoring waveguide.

8. The optical modulator as claimed in claim 5, wherein the length of said first waveguide coupling element is set so that said two first output waveguides in said first coupler may branch the light from said first waveguide coupling element with a power ratio of 1:1 without depending upon the polarization, and one of said two first output waveguides is used as a signal light propagating waveguide while the other of said two first output waveguides is used as a monitoring waveguide.

9. The optical modulator as claimed in claim 3, wherein the length of said second waveguide coupling element is set so that said two second output waveguides in said second coupler may branch the light from said second waveguide coupling element with a power ratio of 1:1 without depending upon the polarization, and one of said two second output waveguides is used as a signal light propagating waveguide while the other of said two second output waveguides is used as a monitoring waveguide.

10. The optical modulator as claimed in claim 4, wherein the length of said second waveguide coupling element is set so that said two second output waveguides in said second coupler may branch the light from said second waveguide coupling element with a power ratio of 1:1 without depending upon the polarization, and one of said two second output waveguides is used as a signal light propagating waveguide while the other of said two second output waveguides is used as a monitoring waveguide.

11. The optical modulator as claimed in claim 5, wherein the length of said second waveguide coupling element is set so that said two second output waveguides in said second coupler may branch the light from said second waveguide coupling element with a power ratio of 1:1 without depending upon the polarization, and one of said two second output waveguides is used as a signal light propagating waveguide while the other of said two second output waveguides is used as a monitoring waveguide.

12. The optical modulator as claimed in claim 1, wherein the distances $d_{11}$ and $d_{21}$ or the distances $d_{12}$ and $d_{22}$ are substantially equal to each other, and the widths $w_{o11}$ and $w_{o21}$ or the widths $w_{o12}$ and $w_{o22}$ are substantially equal to each other.

13. The optical modulator as claimed in claim 2, wherein the distances $d_{11}$ and $d_{21}$ or the distances $d_{12}$ and $d_{22}$ are substantially equal to each other, and the widths $w_{o11}$ and $w_{o21}$ or the widths $w_{o12}$ and $w_{o22}$ are substantially equal to each other.

14. The optical modulator as claimed in claim 3, wherein the distances $d_{11}$ and $d_{21}$ or the distances $d_{12}$ and $d_{22}$ are substantially equal to each other, and the widths $w_{011}$ and $w_{021}$ or the widths $w_{012}$ and $w_{022}$ are substantially equal to each other.

15. The optical modulator as claimed in claim 4, wherein the distances $d_{11}$ and $d_{21}$ or the distances $d_{12}$ and $d_{22}$ are substantially equal to each other, and the widths $w_{011}$ and $w_{021}$ or the widths $w_{012}$ and $w_{022}$ are substantially equal to each other.

16. The optical modulator as claimed in claim 5, wherein the distances $d_{11}$ and $d_{21}$ or the distances $d_{12}$ and $d_{22}$ are substantially equal to each other, and the widths $w_{011}$ and $w_{021}$ or the widths $w_{012}$ and $w_{022}$ are substantially equal to each other.

17. The optical modulator as claimed in claim 1, wherein the widths $w_{w11}$ and $w_{w21}$ or the widths $w_{w12}$ and $w_{w22}$ of said waveguide coupling element are substantially equal to each other.

18. The optical modulator as claimed in claim 2, wherein the widths $w_{w11}$ and $w_{w21}$ or the widths $w_{w12}$ and $w_{w22}$ of said waveguide coupling element are substantially equal to each other.

19. The optical modulator as claimed in claim 3, wherein the widths $w_{w11}$ and $w_{w21}$ or the widths $w_{w12}$ and $w_{w12}$ of said waveguide coupling element are substantially equal to each other.

20. The optical modulator as claimed in claim 4, wherein the widths $w_{w11}$ and $w_{w21}$ or the widths $w_{w12}$ and $w_{w22}$ of said waveguide coupling element are substantially equal to each other.

21. The optical modulator as claimed in claim 5, wherein the widths $w_{w11}$ and $w_{w21}$ or the widths $w_{w12}$ and $w_{w22}$ of said waveguide coupling element are substantially equal to each other.

22. The optical modulator as claimed in claim 1, wherein said input waveguides and output waveguides are connected to said waveguide coupling element with an opening angle of 0.5 degrees or more at the connecting portions.

23. The optical modulator as claimed in claim 2, wherein said input waveguides and output waveguides are connected to said waveguide coupling element with an opening angle of 0.5 degrees or more at the connecting portions.

24. The optical modulator as claimed in claim 3, wherein said input waveguides and output waveguides are connected to said waveguide coupling element with an opening angle of 0.5 degrees or more at the connecting portions.

25. The optical modulator as claimed in claim 4, wherein said input waveguides and output waveguides are connected to said waveguide coupling element with an opening angle of 0.5 degrees or more at the connecting portions.

26. The optical modulator as claimed in claim 5, wherein said input waveguides and output waveguides are connected to said waveguide coupling element with an opening angle of 0.5 degrees or more at the connecting portions.

* * * * *

UNITED STATES PATENT AND TRADEMARK OFFICE
CERTIFICATE OF CORRECTION

PATENT NO. : 7,315,676 B2 Page 1 of 1
APPLICATION NO. : 11/505330
DATED : January 1, 2008
INVENTOR(S) : Masaharu Doi et al.

It is certified that error appears in the above-identified patent and that said Letters Patent is hereby corrected as shown below:

Col. 41, line 50, delete "$w_{01}$" and insert -- $w_{011}$ --, therefor.

Col. 43, line 25, delete "$w_{w12}$" (second occurrence) and insert -- $w_{w22}$ --, therefor.

Signed and Sealed this

Third Day of June, 2008

JON W. DUDAS
*Director of the United States Patent and Trademark Office*